(12) United States Patent
Vallaro et al.

(10) Patent No.: US 11,394,077 B1
(45) Date of Patent: Jul. 19, 2022

(54) CONFORMAL WEARABLE BATTERY

(71) Applicant: Inventus Power, Inc., Woodridge, IL (US)

(72) Inventors: Timothy James Vallaro, Batavia, IL (US); Paul John Kudrna, Naperville, IL (US); Elijah Brett Goldin, Colorado Springs, CO (US); Daniel Paul Rose, Wheaton, IL (US); John Lundeen, Chicago, IL (US)

(73) Assignee: Inventus Power, Inc., Woodridge, IL (US)

( * ) Notice: Subject to any disclaimer, the term of this patent is extended or adjusted under 35 U.S.C. 154(b) by 0 days.

(21) Appl. No.: 17/568,570

(22) Filed: Jan. 4, 2022

Related U.S. Application Data

(60) Continuation-in-part of application No. 17/377,071, filed on Jul. 15, 2021, which is a division of
(Continued)

(51) Int. Cl.
*H01M 10/36* (2010.01)
*H01M 50/209* (2021.01)
(Continued)

(52) U.S. Cl.
CPC ....... *H01M 50/209* (2021.01); *H01M 10/425* (2013.01); *H01M 50/24* (2021.01);
(Continued)

(58) Field of Classification Search
CPC .. H01M 50/209; H01M 10/425; H01M 50/24; H01M 50/26; H01M 50/502; H01M 2200/00
See application file for complete search history.

(56) References Cited

U.S. PATENT DOCUMENTS

| 3,993,507 A | 11/1976 | Hardigg |
| 4,053,685 A | 10/1977 | Rowley et al. |

(Continued)

FOREIGN PATENT DOCUMENTS

| CN | 201922162396 | 7/2020 |
| KR | 20080056978 A | 6/2008 |

(Continued)

OTHER PUBLICATIONS

Rogers Corporation, "Poron@ ShockSeal™ 4790-79 Foams," visited on Nov. 2, 2020 at <https://rogerscorp.com/Elastomeric%20Material%20Solutions/PORON%20Industrial%20Polyurethanes/PORON%20ShockSeal%204790%2079%20Foams>, 3 pp.

(Continued)

*Primary Examiner* — Cynthia K Walls
(74) *Attorney, Agent, or Firm* — Banner & Witcoff, Ltd.

(57) ABSTRACT

A battery system includes a plurality of non-cylindrical shaped battery cells arranged on, and physically affixed to, a flexible printed circuit board (PCB). The PCB may include a bend axis that facilitates folding of the flexible PCB to form an upper portion of the flexible PCB and a lower portion of the flexible PCB. A central stiffener may be positioned between the upper portion and the lower portion of the flexible PCB using an adhesive foam tape to form a battery assembly. The battery system may include a flexible housing with an internal cavity that receives the battery assembly. The central stiffener, and the adhesive foam tape, may provide a degree of rigidity and/or absorption to the PCB to reduce localized deformation of the PCB when the battery system experiences shock forces and to prevent damage to components of the battery assembly. The stiffener may be formed from non-metallic material.

20 Claims, 15 Drawing Sheets

Related U.S. Application Data application No. 17/202,109, filed on Mar. 15, 2021, now Pat. No. 11,251,497, and application No. 17/568,570, Jan. 4, 2022, which is a continuation-in-part of application No. 17/202,109, filed on Mar. 15, 2021, now Pat. No. 11,251,497.

(51) Int. Cl.
*H01M 10/42* (2006.01)
*H01M 50/24* (2021.01)
*H01M 50/26* (2021.01)
*H01M 50/502* (2021.01)

(52) U.S. Cl.
CPC ......... *H01M 50/26* (2021.01); *H01M 50/502* (2021.01); *H01M 2200/00* (2013.01)

(56) References Cited

U.S. PATENT DOCUMENTS

| | | | |
|---|---|---|---|
| 4,346,151 | A | 8/1982 | Uba et al. |
| 4,658,498 | A | 4/1987 | Yamaura et al. |
| 6,376,126 | B1 | 4/2002 | Faust et al. |
| 6,410,184 | B1 | 6/2002 | Horiuchi et al. |
| 6,528,204 | B1 | 3/2003 | Hikmet et al. |
| 6,773,848 | B1 | 8/2004 | Nortoft et al. |
| 7,545,649 | B2 | 6/2009 | Tan |
| 8,192,863 | B2 | 6/2012 | Best et al. |
| 8,767,405 | B2 | 7/2014 | Tokuda et al. |
| 8,795,880 | B2 | 8/2014 | Matsubara |
| 8,860,372 | B2 | 10/2014 | Guang et al. |
| 8,927,137 | B2 | 1/2015 | Ayub et al. |
| 9,564,761 | B2 | 2/2017 | Hopfer, III et al. |
| 9,640,831 | B2 | 5/2017 | Tajima et al. |
| 9,660,225 | B2 | 5/2017 | Miyake |
| 9,755,279 | B2 | 9/2017 | Moon |
| 9,756,733 | B2 | 9/2017 | Drzaic et al. |
| 9,780,421 | B2 | 10/2017 | Palanchon et al. |
| 9,843,073 | B2 | 12/2017 | Yoneda et al. |
| 9,923,186 | B2 | 3/2018 | Tsunaki et al. |
| 9,941,506 | B2 | 4/2018 | Hiroki et al. |
| 10,056,584 | B2 | 8/2018 | Hwang |
| 10,134,528 | B2 | 11/2018 | Stockman |
| 10,224,517 | B2 | 3/2019 | Kimura |
| 10,236,492 | B2 | 3/2019 | Miyake |
| 10,320,025 | B2 | 6/2019 | Hiroki et al. |
| 10,388,939 | B2 | 8/2019 | Urano et al. |
| 10,686,167 | B2 | 6/2020 | Goto et al. |
| 10,950,913 | B1 | 3/2021 | Goldin et al. |
| 11,108,105 | B2 | 8/2021 | Takahashi et al. |
| 2002/0017700 | A1 | 2/2002 | Mori et al. |
| 2002/0127362 | A1 | 9/2002 | Jansen et al. |
| 2004/0009334 | A1 | 1/2004 | Miyamoto et al. |
| 2005/0253553 | A1 | 11/2005 | Phillips et al. |
| 2006/0210841 | A1 | 9/2006 | Wallace et al. |
| 2008/0241677 | A1 | 10/2008 | Garcia Alberola |
| 2008/0241680 | A1 | 10/2008 | Lee et al. |
| 2009/0253034 | A1 | 10/2009 | Nedelec |
| 2009/0291361 | A1 | 11/2009 | Scorziello |
| 2013/0295434 | A1 | 11/2013 | Ayub et al. |
| 2014/0212695 | A1 | 7/2014 | Lane et al. |
| 2014/0216814 | A1 | 8/2014 | Suzuki |
| 2015/0044511 | A1 | 2/2015 | Kim et al. |
| 2015/0093982 | A1 | 4/2015 | Bailey |
| 2015/0194697 | A1 | 7/2015 | Hung et al. |
| 2015/0280186 | A1 | 10/2015 | Fan |
| 2015/0311495 | A1 | 10/2015 | Wang |
| 2016/0003463 | A1 | 1/2016 | Rodinger et al. |
| 2016/0156012 | A1 | 6/2016 | Takahashi et al. |
| 2016/0218387 | A1 | 7/2016 | Tajima |
| 2016/0233695 | A1 | 8/2016 | Hopfer, III et al. |
| 2017/0018784 | A1 | 1/2017 | Yun et al. |
| 2017/0025669 | A1 | 1/2017 | Urano et al. |
| 2017/0079139 | A1 | 3/2017 | Wu |
| 2018/0026235 | A1 | 1/2018 | Akhmad |
| 2018/0062197 | A1 | 3/2018 | Thiel et al. |
| 2018/0083233 | A1 | 3/2018 | Young et al. |
| 2018/0175346 | A1 | 6/2018 | Schmid-Schoenbein |
| 2018/0223070 | A1 | 8/2018 | O'Neil et al. |
| 2018/0261900 | A1 | 9/2018 | Kim et al. |
| 2018/0301741 | A1 | 10/2018 | Kumar et al. |
| 2019/0044197 | A1 | 2/2019 | Ota et al. |
| 2019/0088979 | A1 | 3/2019 | Grady et al. |
| 2019/0090350 | A1 | 3/2019 | Kumar |
| 2019/0237832 | A1 | 8/2019 | Ju et al. |
| 2019/0305303 | A1 | 10/2019 | Yebka et al. |
| 2019/0326647 | A1 | 10/2019 | Kawai et al. |
| 2020/0127259 | A1 | 4/2020 | Yoshida et al. |
| 2020/0227693 | A1 | 7/2020 | Enomoto |
| 2020/0243808 | A1 | 7/2020 | Harutyunyan et al. |
| 2020/0245495 | A1 | 7/2020 | Yi et al. |
| 2020/0403566 | A1 | 12/2020 | Yamaai et al. |

FOREIGN PATENT DOCUMENTS

| | | |
|---|---|---|
| WO | 08023199 A1 | 2/2008 |
| WO | 17209052 A1 | 12/2017 |
| WO | 2019/025235 A1 | 2/2019 |

OTHER PUBLICATIONS

Inventus Power, "Conformal Wearable Batteries Safe, 'Flexible, Wearable Power Designed to Increase Mission Effectiveness'," visited on Nov. 4, 2020 at <https://inventuspower.com/conformal-wearable-batteries/>, pp. 3.

Rebecca Cragun, et al., "Li-Ion Conformal Wearable Battery," EaglePicher Technologies, LLC visited on Feb. 9, 2020 at <http://www.powersourcesconference.com/Power%20Sources%202018%20Digest/docs/34-2.pdf>, pp. 577-580.

Eaglepicher Technologies, "Rechargeable Conformal Battery", visited on Feb. 9, 2020 at <https://www.eaglepicher.com/sites/default/files/SLB-101%20061419.pdf>, pp. 2.

Feb. 25, 2021—U.S. Non-Final Office Action—U.S. Appl. No. 17/085,928.

Jul. 1, 2021—(WO) ISR & WO—App. No. PCT/US2021/022377.

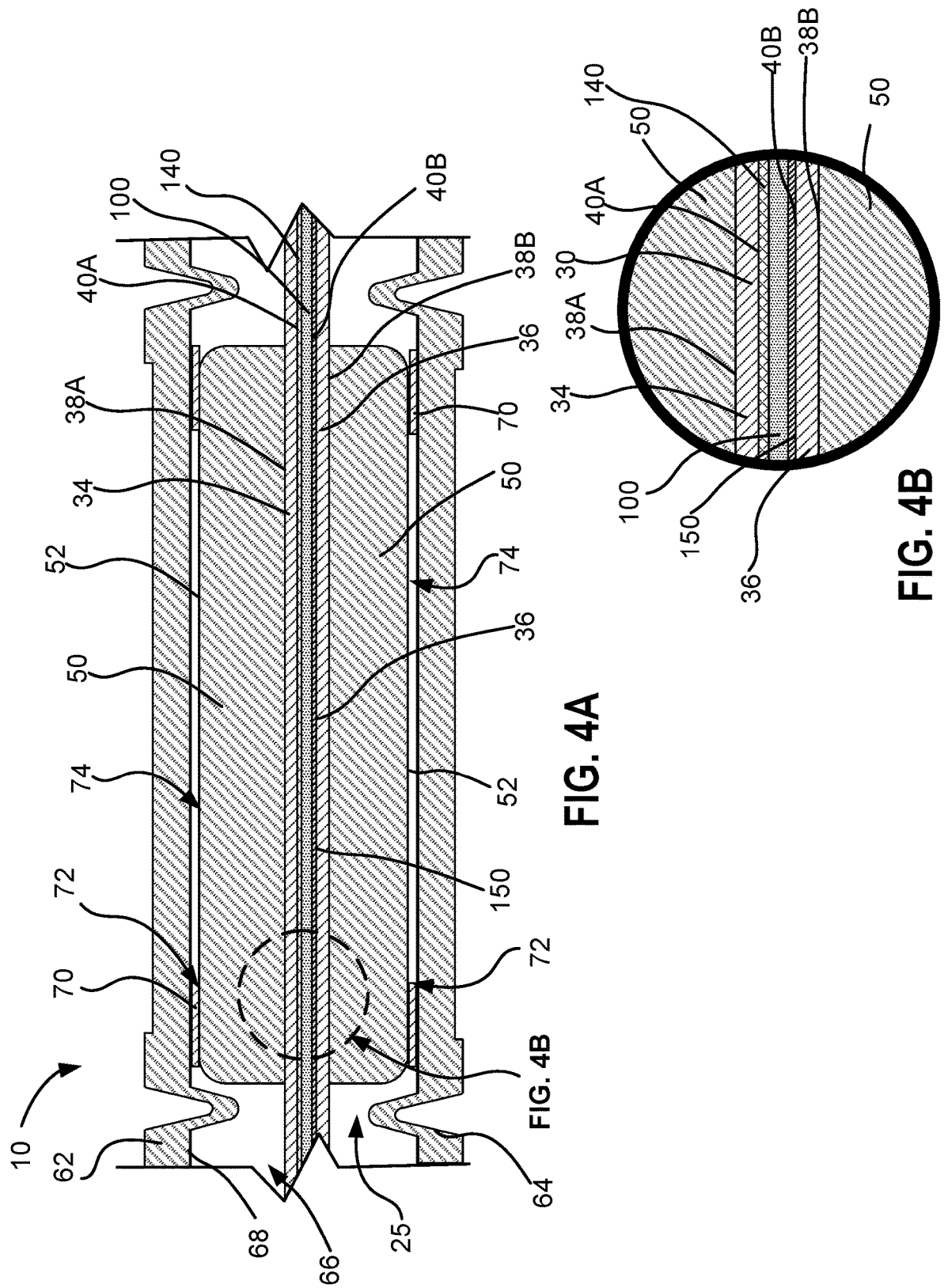

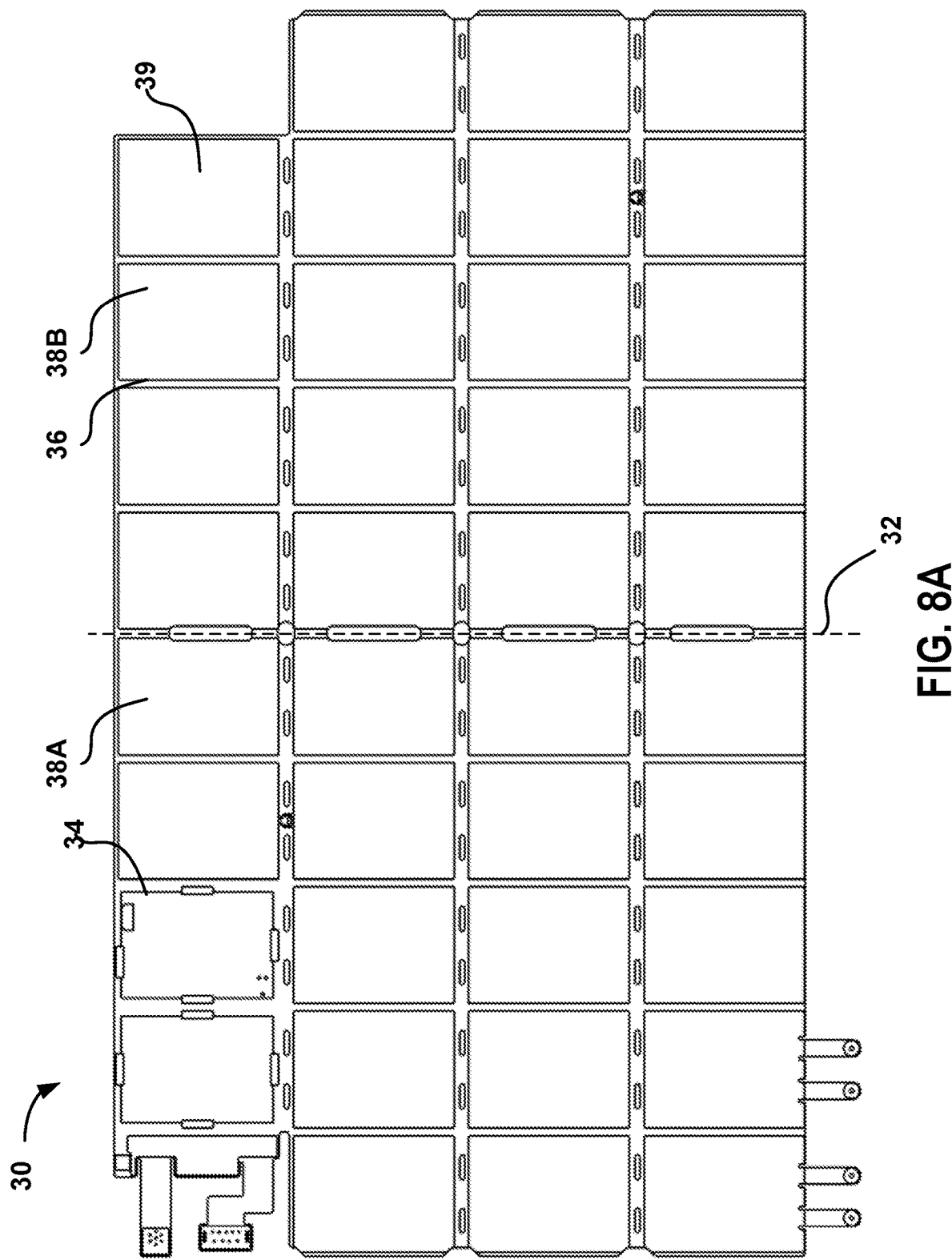

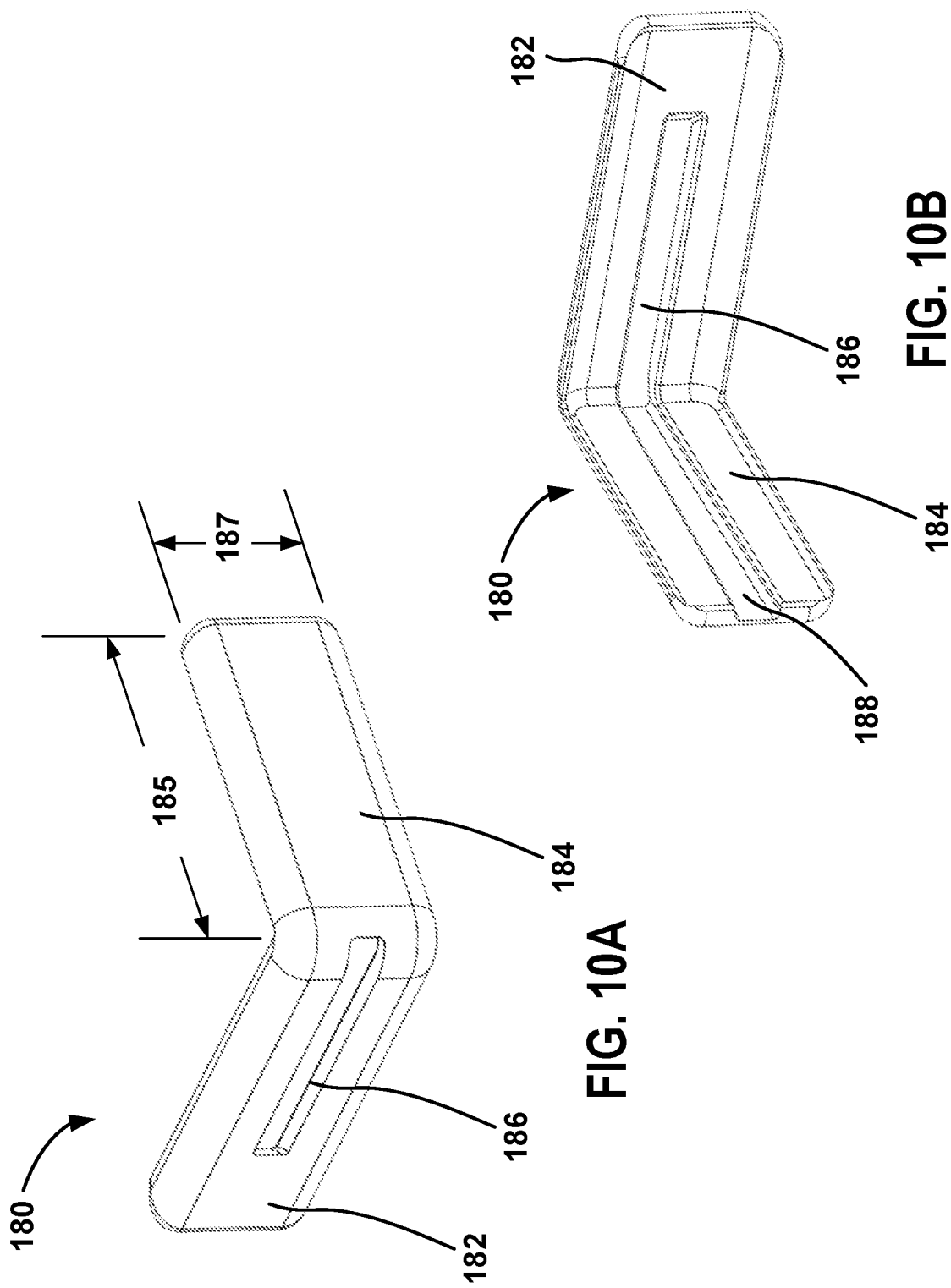

CONFORMAL WEARABLE BATTERY

CROSS-REFERENCE TO RELATED APPLICATIONS

This application is a continuation-in-part of U.S. patent application Ser. No. 17/202,109, entitled "Conformal Wearable Battery" filed on Mar. 15, 2021. This application is also a continuation-in-part of U.S. patent application Ser. No. 17/377,071, entitled "Conformal Wearable Battery" filed Jul. 15, 2021, which is a divisional of U.S. patent application Ser. No. 17/202,109, entitled "Conformal Wearable Battery" filed on Mar. 15, 2021. All of the above listed applications are herein incorporated by reference in their entirety.

FIELD

Aspects described herein generally relate to portable electrical power storage systems. More specifically, aspects of this disclosure relate to a bracing member or stiffener configured to absorb and/or reduce shock and vibration forces experienced by the electronic members of a portable electrical power storage system.

BACKGROUND

Portable battery systems may be utilized to provide mobile and/or remote location electrical power. Integrated communications equipment and/or weapons gear utilized, for example, by law enforcement and/or military personnel requires increasingly high levels of power storage carried proximate the user's body. Methods of increasing power storage capability in a device, such as a conformal wearable battery (CWB) are to include additional battery cells and/or use higher capacity battery cells. However, these solutions may unacceptably increase the size and/or weight of the resulting systems, reducing mobility.

In addition, batteries may come in different shapes and sizes depending on their intended usage. Some batteries may be arranged as packages of battery cells that are assembled together to provide a predetermined power output. These battery packages may be arranged in a durable and sealed housing to protect the batteries from damage. In some instances, the battery packages may be desired to flex or bend and may have shock or vibration absorbing features to accommodate their intended usage.

As such, the mobile electrical power storage industry desires increased power capacity while improving an overall user safety of these systems while simultaneously reducing their size and weight.

BRIEF SUMMARY

Aspects of the disclosure provide solutions that address and overcome technical problems associated with minimizing size of a portable battery system (e.g. a conformal wearable battery system).

Some aspects of this disclosure may relate to a conformal wearable battery (CWB) that comprises: a plurality of battery cells, and a folded flexible printed circuit board (PCB) that includes a plurality of physical connection sections disposed in a grid like pattern, where each battery cells of the plurality of battery cells is affixed to the folded flexible PCB; and a bend axis that delineates an upper portion of the folded flexible PCB and a lower portion of the folded flexible PCB. The CWB may also include a central stiffener positioned between the upper portion of the folded flexible PCB and the lower portion of the folded flexible PCB, where the central stiffener comprises a non-metallic material with a flexural strength within a range of 410 MPa and 560 MPa. The CWB may further include a flexible housing that receives the plurality of battery cells, the folded flexible PCB, and the central stiffener. The central stiffener comprises a glass filled composite or a polycarbonate material. The stiffener may also have a thickness within a range of 0.13 millimeters (mm) and 0.38 millimeters. In addition, the central stiffener may include a corner that extends beyond a corresponding corner of the upper portion or the lower portion of the folded flexible PCB. The corner of the central stiffener may comprise a protrusion that extends beyond a lower edge of the central stiffener. In addition, a corner bumper may be used to provide additional shock absorbing functionality and may include a notch that receives the protrusion of the central stiffener. The central stiffener may have an elastic modulus within a range of 2.0 GPa and 15 GPa and may be secured to the upper portion of the folded flexible PCB with a first adhesive tape and is secured to the lower portion of the flexible PCB with a second adhesive tape. The first adhesive tape may have a different thickness than the second adhesive tape, such as to maintain co-planarity based on a thickness of components affixed to the flexible PCB. In some examples, the central stiffener may include an aperture that extends through the central stiffener, and the aperture of the central stiffener may include a plurality of apertures that are arranged in a pattern of rows and columns. The non-metallic material forming the central stiffener may have an ultimate tensile strength within a range of 69 MPa and 276 MPa. As another feature, the central stiffener may include a hole near an upper corner of the central stiffener to connect to a connector stabilizer on at least one side of the folded flexible PCB, where a fastener is received in a hole of the central stiffener and a hole in the connector stabilizer.

Still additional aspects of this disclosure may relate to a conformal wearable battery (CWB) that comprises a battery cell core pack assembly comprising: (1) a folded flexible printed circuit board (PCB), where a bend axis that delineates an upper portion of the flexible PCB and a lower portion of the flexible PCB; (2) a plurality of battery cells affixed to the flexible PCB and forming a flexible PCBA, and (3) a non-metallic central stiffener positioned and affixed between the upper portion of the folded flexible PCB and the lower portion of the folded flexible PCB preventing the upper portion from contacting the lower portion and forming a battery cell core pack assembly, where a corner of the central stiffener extends beyond a corresponding corner of the upper portion or the lower portion of the flexible PCB. The CWB may include a housing comprising an upper housing member, a lower housing member, and an internal cavity, wherein the internal cavity receives the battery cell core pack assembly.

The central stiffener may be secured to the upper portion of the flexible PCB with a first adhesive tape having a first tape thickness and is secured to the lower portion of the flexible PCB with a second adhesive tape having a second tape thickness, and where the first tape thickness may be different than the second tape thickness. The second adhesive tape may comprise a foam tape, where the second tape thickness is greater than the first tape thickness. The central stiffener may have a thickness within a range of 0.13 millimeters and 0.38 millimeters, and may have an elastic modulus within a range of 2.0 GPa and 15 GPa. In some examples, the central stiffener may have a weight within a range of 6 grams and 20 grams.

Yet other aspects of this disclosure may relate to a system comprising battery cell core pack assembly that includes: (1) a folded flexible printed circuit board (PCB), where a bend axis that delineates an upper portion of the folded flexible PCB and a lower portion of the folded flexible PCB; (2) a plurality of battery cells affixed to the flexible PCB, where each battery cell of the plurality of battery cells is a pouch cell type battery; and (3) a central stiffener positioned between the upper portion and the lower portion of the flexible PCB preventing the upper portion from contacting the lower portion, the central stiffener having a corner that extends beyond a corresponding corner of the upper portion or the lower portion of the flexible PCB. The central stiffener may comprise a glass filled composite that is secured to the upper portion of the folded flexible PCB with a first adhesive tape and is secured to the lower portion of the folded flexible PCB with a second adhesive tape. The first adhesive tape may have a different thickness than the second adhesive tape. The system may also include a flexible housing that includes an internal cavity, where the internal cavity receives the flexible printed circuit board assembly. The corner of the central stiffener may comprise of a protrusion that extends beyond a lower edge of the central stiffener.

BRIEF DESCRIPTION OF THE DRAWINGS

The present disclosure is illustrated by way of example and not limited in the accompanying figures in which like reference numerals indicate similar elements and in which:

FIG. 4A illustrates a cross-sectional side view of the CWB of FIG. 3B according to aspects described herein;

FIG. 4B illustrates an partial enlarged view of FIG. 4A according to aspects described herein;

FIG. 8A illustrates a front view of an illustrative flexible printed circuit board for an illustrative conformal wearable battery system according to aspects described herein;

FIGS. 10A-10B illustrate perspective views of an exemplary corner bumper of the battery cell core pack assembly of FIG. 2A according to aspects described herein.

DETAILED DESCRIPTION

Figure 1:
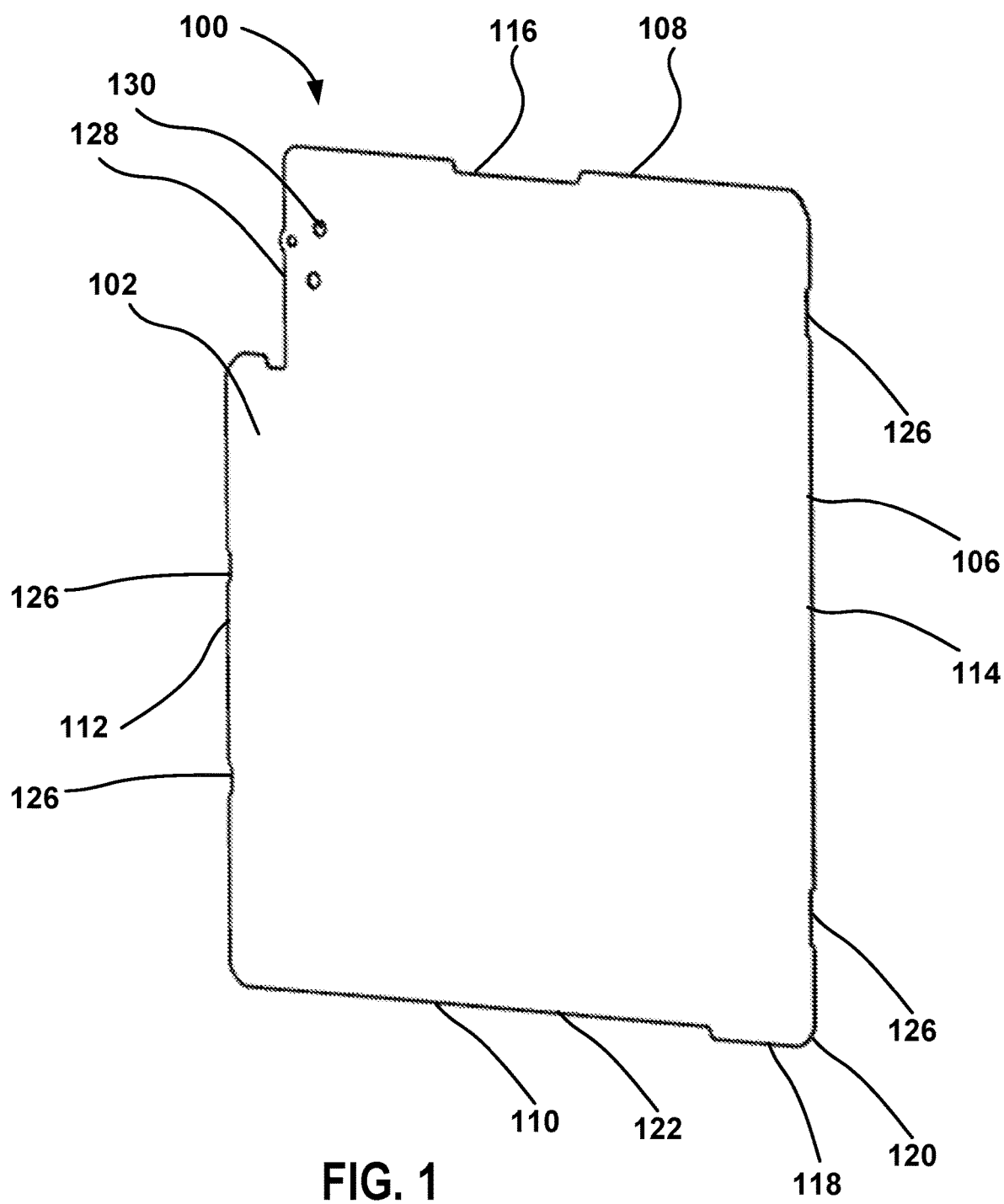
FIG. 1 illustrates a right, front perspective view of an exemplary central stiffener for a PCBA of a conformal wearable battery (CWB) according to aspects described herein.

In the following description of various illustrative arrangements, reference is made to the accompanying drawings, which form a part hereof, and in which is shown, by way of illustration, various arrangements in which aspects of the disclosure may be practiced. It is to be understood that other arrangements may be utilized, and structural and functional modifications may be made, without departing from the scope of the present disclosure. It is noted that the accompanying drawings may not be drawn to scale.

It is noted that various connections between elements are discussed in the following description. It is noted that these connections are general and, unless specified otherwise, may be direct or indirect, and that the specification is not intended to be limiting in this respect.

A portable battery system and/or a rechargeable conformal wearable battery (CWB) may be worn by a user to power electronic devices that the user carries. The CWB may be subjected to a multitude of environmental conditions such as harsh shock and vibration, moisture exposure, and extreme temperatures. To provide a desired power output, the CWB may include a plurality of battery cells, each with a rated power capacity and when electrically connected, may allow the CWB to provide a desired power output. The CWB may have a flexible housing that is sealed to facilitate longer battery life and utility for the user regardless of environmental conditions it may encounter.

A CWB may include an array of a first quantity of battery cells disposed adjacent to one another in a horizontal direction and a second quantity of battery cells disposed adjacent to one another in a vertical direction. The array of battery cells may be arranged in a grid-like pattern. Each of the battery cells may be encased or housed in a battery cell housing (e.g., a pouch, a metal enclosure, etc.) separate from other battery cells. A battery cell as described herein may include a plurality of individual battery cell elements that are electrically connected together to form a compound battery cell that electrically performs as a single unit. Each of the battery cells may be physically connected to adjacent battery cells by flexible elements (e.g., a flexible printed circuit board (PCB)). The array of battery cells may be attached to the flexible PCB to form a flexible printed circuit board assembly (PCBA). The flexible PCBA, along with a central stiffener, forms a battery cell core pack assembly that is secured in a housing, where the housing may be able to flex, to form the CWB. The CWB may then be able to flex to generally conform to a surface outline or shape of a user wearing the CWB. For example, the housing of the CWB may include one or more grooves or flex lines along which the CWB may flexibly conform to a shape of an object adjacent to the CWB, such as a portion of a user's body. The CWB may be required to meet one or more of the requirements of MIL-PRF-32383.

One or more of the battery cells may include a positive-charge electrical terminal (a cathode) and a negative-charge electrical terminal (an anode) that are electrically connected with the flexible PCB, which also connects a first battery cell to a second battery cell within the array of battery cells to provide electrical power to electrical devices that are connected to the CWB. The array of battery cells may be connected together to route electrical current through the flexible PCB to the set of positive-charge electrical terminals and negative-charge electrical terminals that are shared among the plurality of the battery cells. The positive-charge electrical terminal and the negative-charge electrical terminal may provide an electrical current that passes through an electrically conductive path, for example, through an electronic device, via transfer of electrons through the electrically conductive path between a positive-charge electrical terminal and a negative-charge electrical terminal on the exterior of the CWB. The array of battery cells may be electrically coupled together, for example, in series or in parallel.

In some cases, each battery cell may be provided in a package, such as a button cell, a prismatic cell, a pouch cell, and a cylindrical cell. For example, a pouch cell type battery, which may be formed of electrodes and a liquid, gel, or solid electrolyte that are stacked in layers or laminations and enclosed in a foil envelope housing, which is then sealed. The positive-charge terminal and the negative-charge terminal may each include a conductive region that passes between the interior of the foil envelope housing and the exterior of the foil envelope battery cell housing.

The CWB housing may secure a plurality of the battery cells within an interior region, which may be formed from a molding process such as injection molding. The CWB housing may be formed of a polymeric material, for example. The CWB housing may be sealed to prevent ingress of solid material and/or liquid material, for example, according to an IP67 rating, IP68 rating, or other ingress protection rating. The CWB housing may include a plurality of electrically conductive contacts and/or connectors that may pass between the interior region of the CWB housing and the exterior of the CWB housing. The IP67 rating is specified by the Ingress Protection Code (IP Code) IEC standard 60529. The equivalent European standard is EN 60529. The IP Code may be referred to as the International Protection Code. The IP Code classifies and rates a degree of ingress protection provided by mechanical casings and electrical enclosures for electronic equipment against intrusion, dust, accidental contact, and liquid (e.g., water). In the IP67 rating, the first digit (e.g., '6') specifies a level of protection offered against ingress of solid objects, while the second digit (e.g., '7') specifies a level of protection offered against ingress of liquids. The larger the value of the digit specifying the level of protection, the greater the amount of protection offered. For example, an IP67 rating specifies total protection against dust ingress and protection against short periods of immersion in water. An IP68 rating may require dust resistance and capability for immersion in freshwater (e.g., immersion in 1.5 meters of freshwater for up to 30 minutes duration, immersion in 1.1 meters of freshwater for up to 35 minutes, or other manufacturer defined requirements).

FIG. 1 illustrates an exemplary central stiffener 100 for an exemplary battery cell core pack assembly 25, which may also be called a battery core pack, of an exemplary CWB 10 shown in FIGS. 2A-3B. The battery cell core pack assembly 25 may include a flexible printed circuit board assembly (PCBA) 20. The central stiffener 100 may include a front surface 102, a rear surface 104, a perimeter surface 106 extending between the front surface 102 and the rear surface 104. The central stiffener 100 may also include an upper side 108, a lower side 110 opposite the upper side 108, a first side 112 extending from the upper side 108 to the lower side 110, and a second side 114 extending from the upper side 108 to the lower side 110. In addition, the central stiffener 100 may have a profile shape that is similar to the profile shape of the PCB 30.

Figure 2A:
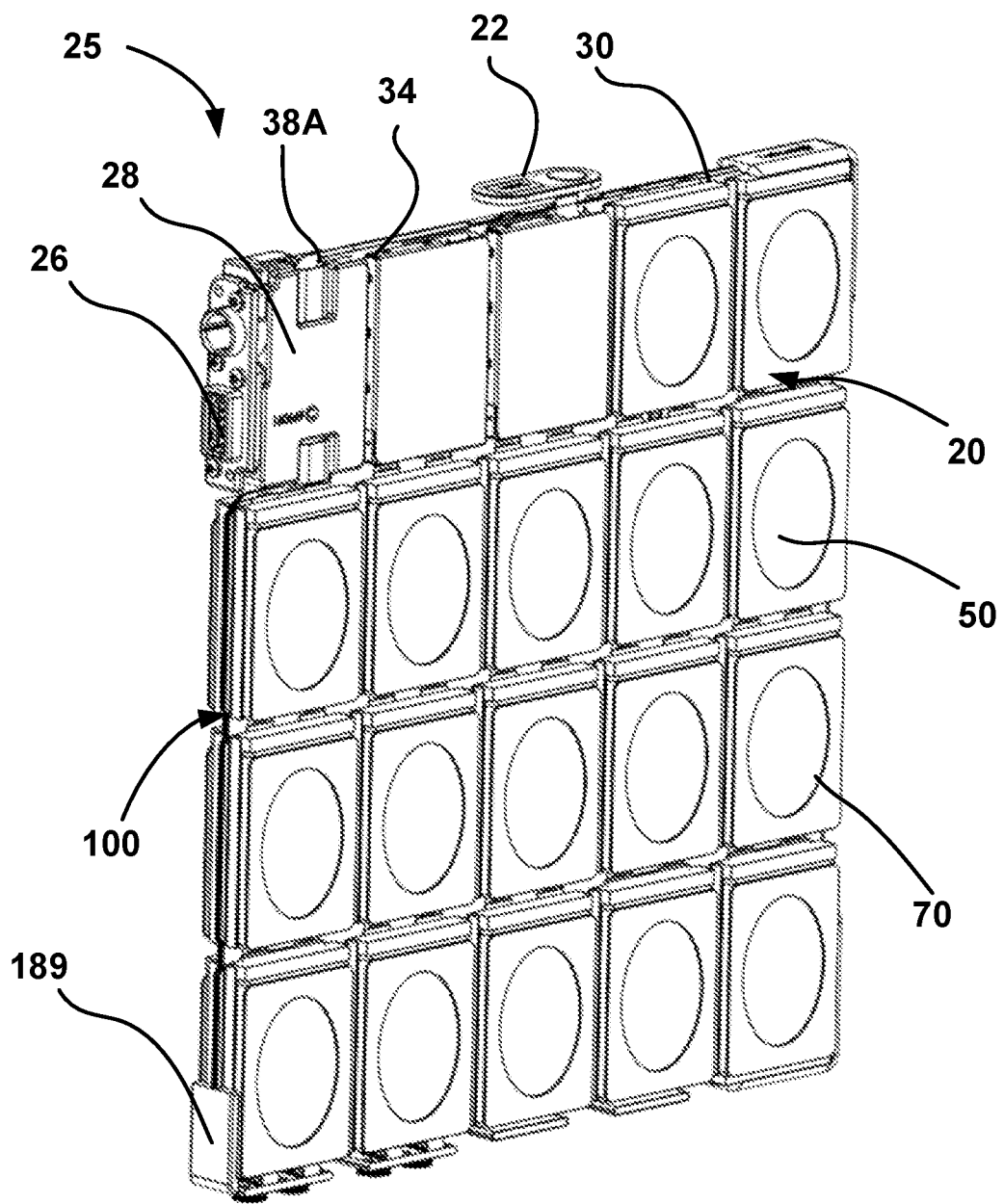
FIG. 2A illustrates a left, front perspective view of a battery cell core pack assembly for a conformal wearable battery (CWB) according to aspects described herein.
Figure 2B:
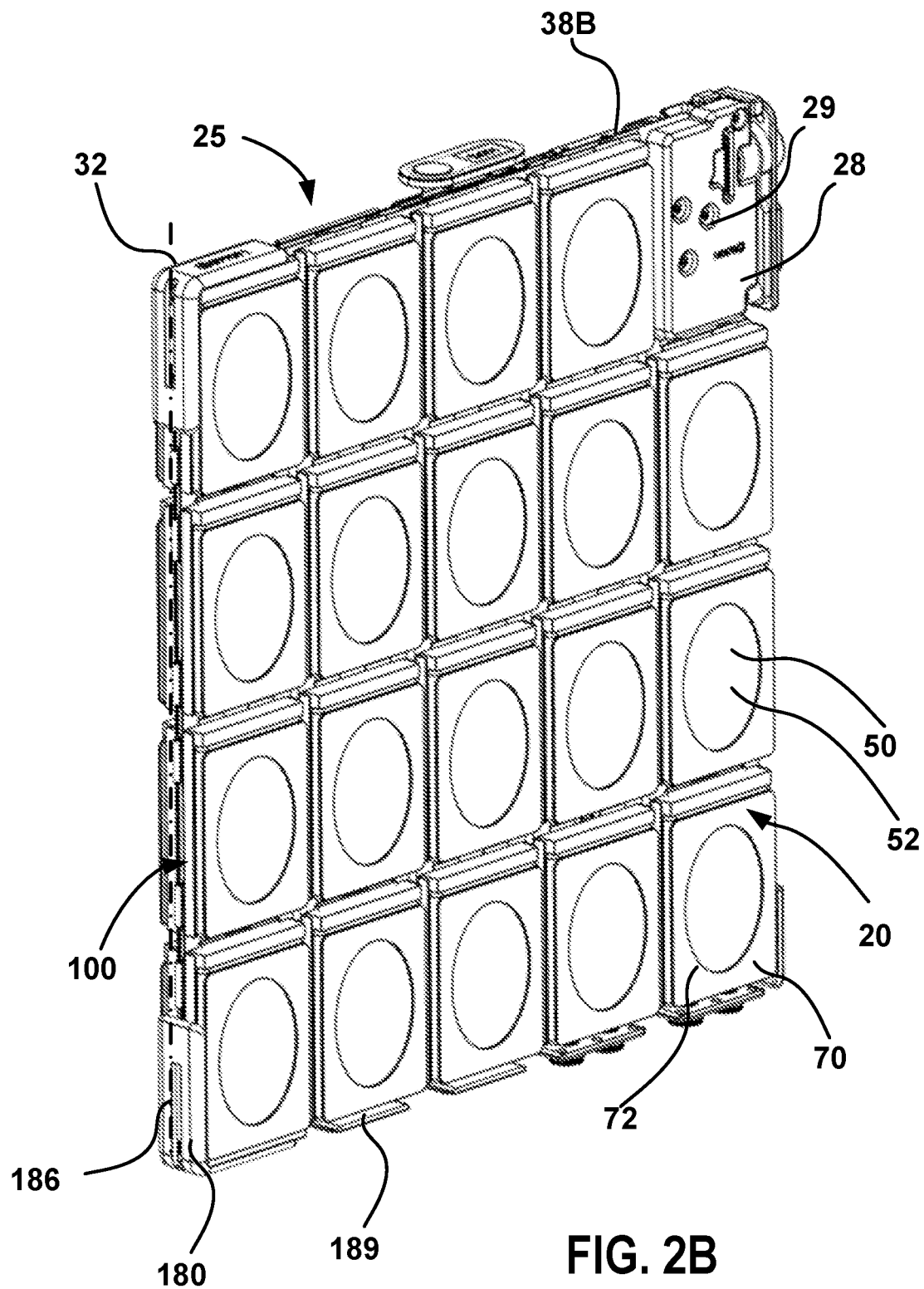
FIG. 2B illustrates a rear perspective view of the battery cell core pack assembly of FIG. 2A according to aspects described herein.
Figure 2C:
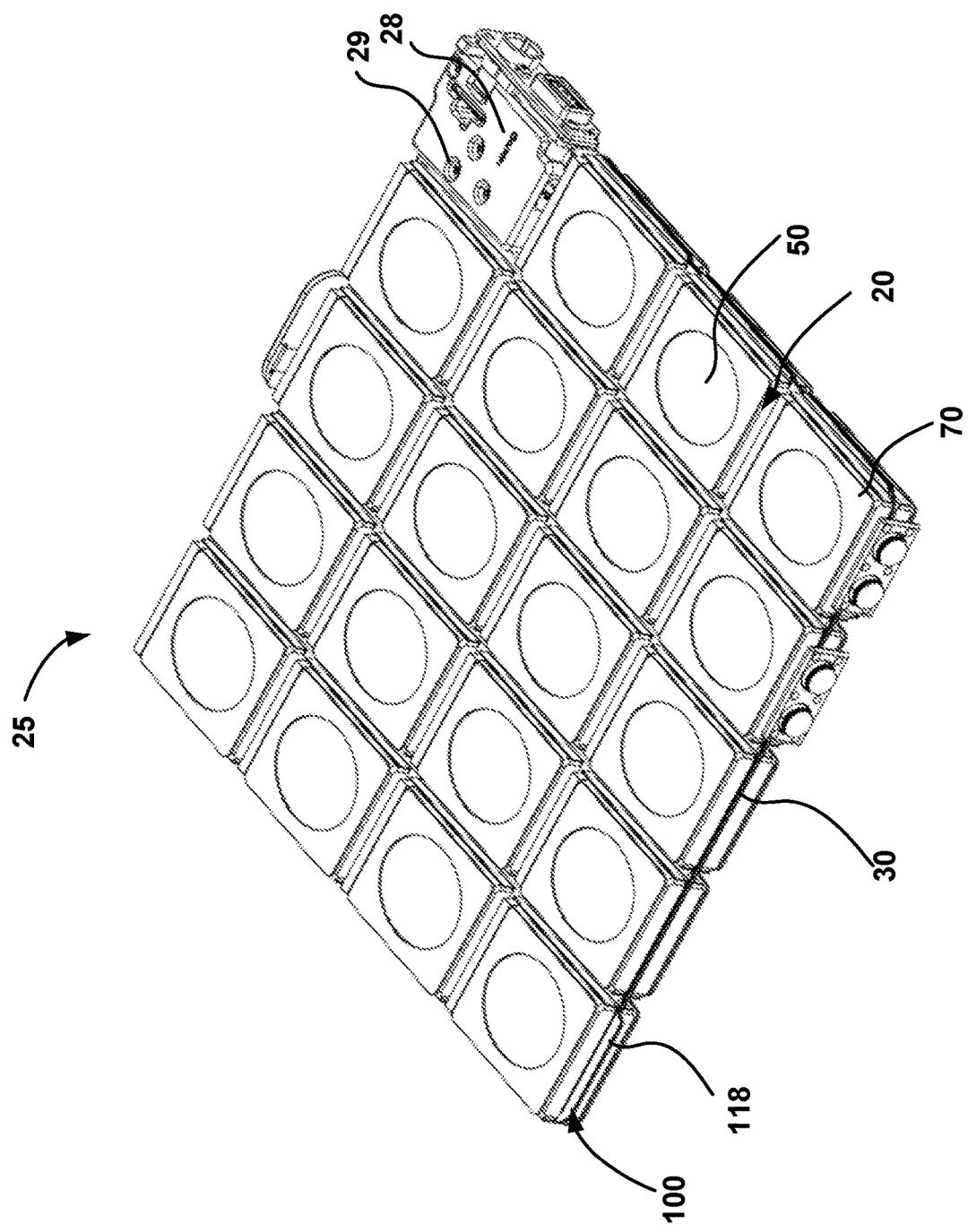
FIG. 2C illustrates a bottom rear perspective view of battery cell core pack assembly of FIG. 2A with bumpers removed according to aspects described herein.
Figure 3A:
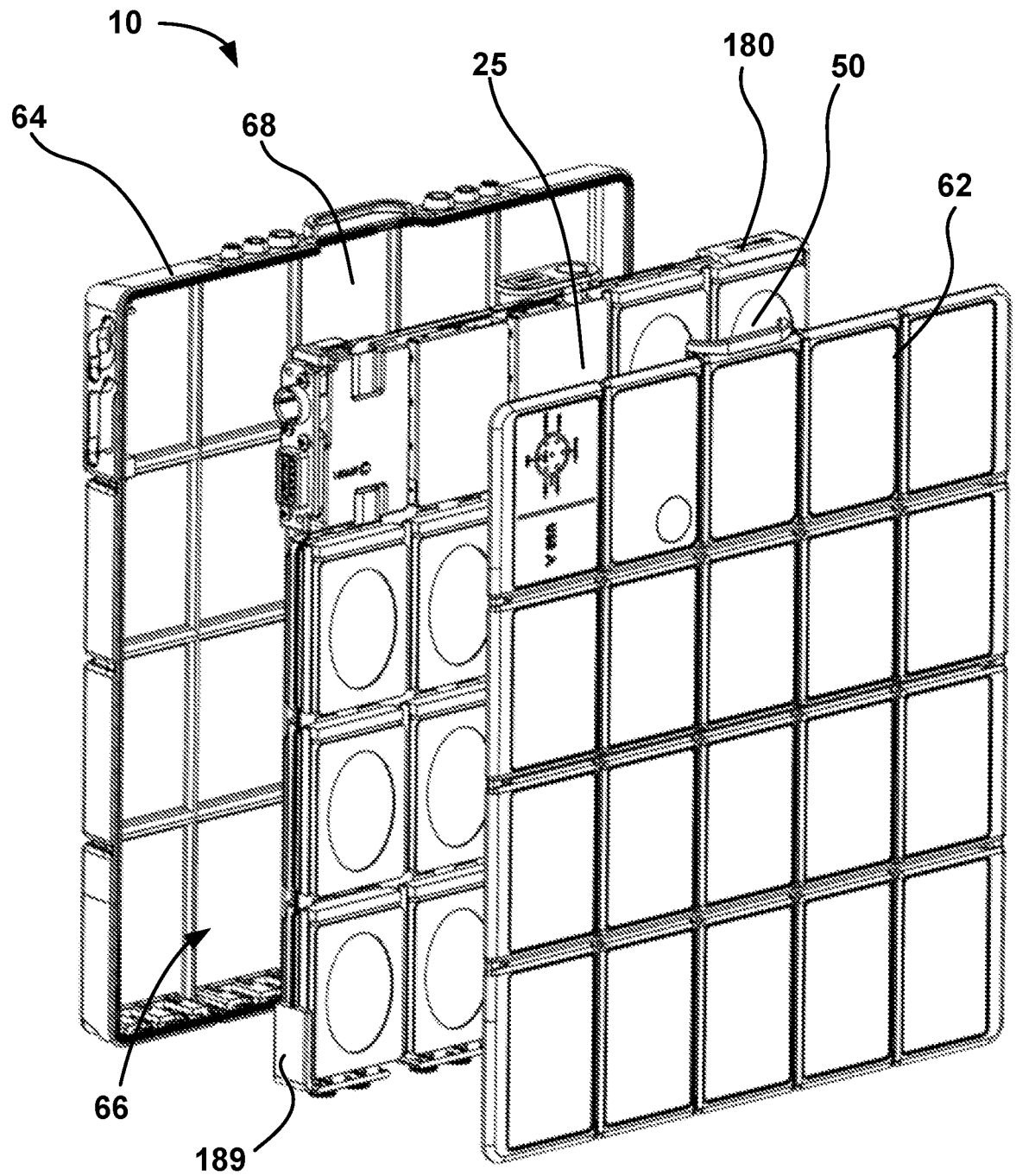
FIG. 3A illustrates a front exploded perspective view of a conformal wearable battery with the battery cell core pack of FIG. 2A according to aspects described herein.
Figure 3B:
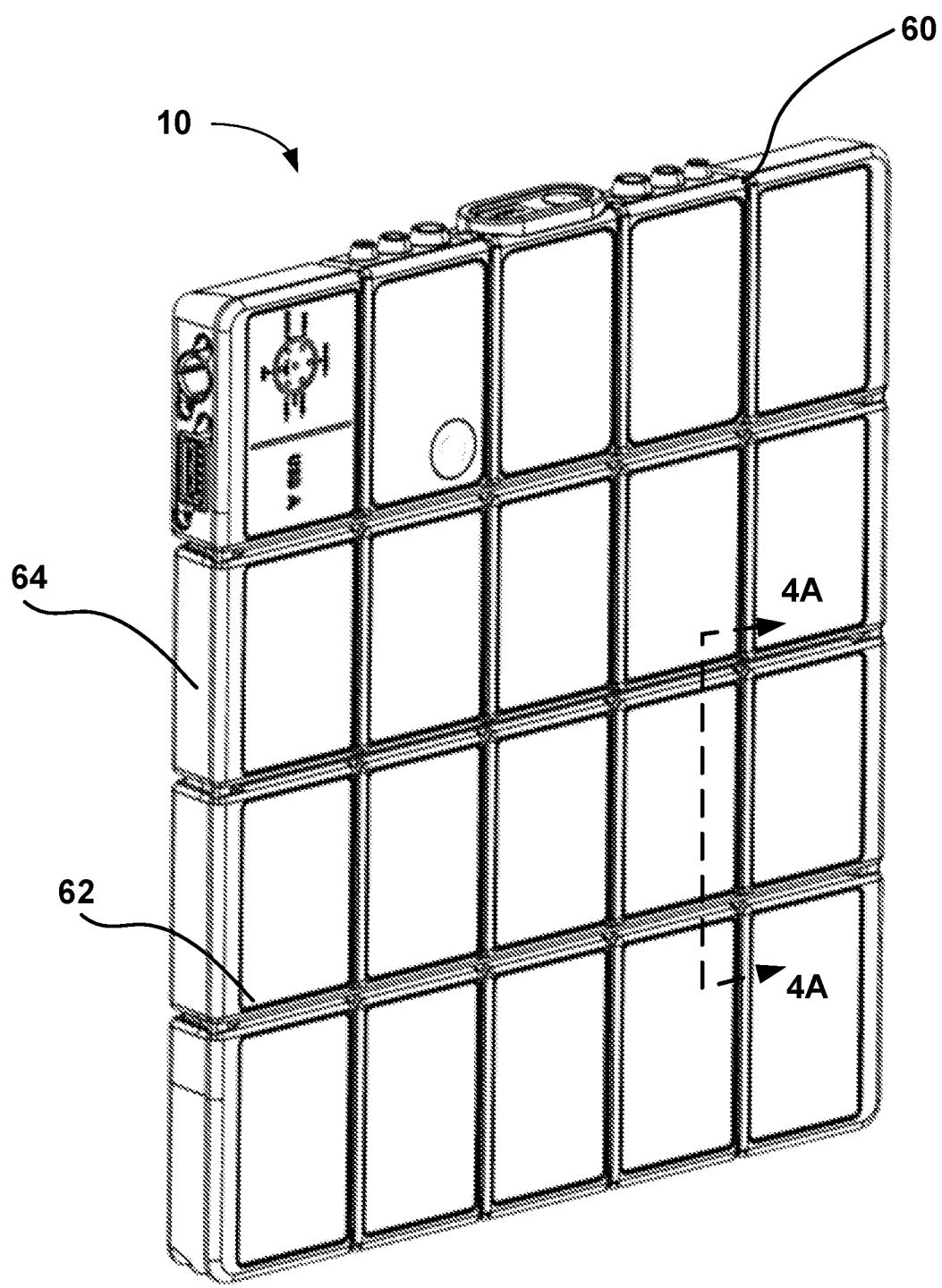
FIG. 3B illustrates a front perspective view of the conformal wearable battery of FIG. 3A according to aspects described herein.

The CWB 10, as shown in FIG. 3B, may be provided in a form factor easily carried by a person, such as within a pocket or other means of securing the CWB 10 to a person's clothing, uniform, or the like. As shown in FIGS. 2A and 2B, the battery cell core pack assembly 25 may include a PCBA 20 that comprises a flexible printed circuit board (PCB) 30 with a plurality of battery cells 50 connected both electrically and physically to the PCB 30. To provide the specified power output, while also providing flexibility for conforming to a shape of person's body or equipment when carried, a matrix of battery cells 50 may be arranged on, and affixed to, a flexible printed circuit board 30. To fit within the housing 60 of the CWB 10, the flexible printed circuit board 30 may have a bend axis 32 (e.g. a centerline) that facilitates folding of the flexible PCB 30 to form a upper portion 34 of the flexible PCB 30 and a lower portion 36 of the flexible PCB 30. Each portion 34, 36 of the flexible PCB 30 may be substantially the same size (e.g., have the substantially the same surface area). Each battery cell 50 may be mounted on an outward facing surface 38A, 38B of each respective portion 34, 36 of the flexible printed circuit board 30 while the electrical connections may be made on an inward facing surface 40A, 40B of the respective upper and lower portions 34, 36 of the folded PCB 30. A central stiffener 100 may be positioned between the upper portion 34 of the PCB 30 and the lower portion 36 of the PCB 30 to prevent the upper portion 34 from contacting the lower portion 36. The central stiffener 100 may also provide electrical insulation capability to electrically insulate the upper portion 34 and the lower portion 36 of the PCB 30 to prevent short circuits between battery cells 50 of the upper portion 34 of the PCB 30 and battery cells 50 of the lower portion 36 of the PCB 30. The central stiffener 100 may provide additional stiffness to the overall battery cell core pack assembly 25 and help absorb energy from a shock or impact event (e.g., from the CWB 10 being dropped) to reduce the amount of impact energy transmitted to the battery cells 50 and components of the PCBA 20 as well as reducing the stress and strain received by the PCB 30 to prevent any yielding, cracking, tearing, or creasing of the PCB 30. The stiffener 100 may also help to prevent the PCB 30 from experiencing excessive localized bending, stress, or strain that can damage any of the battery cells 50 or the various electrical connections on the PCBA 20 such as, for example, when the battery core pack 25 experiences a shock load. As an example, the CWB 10 may be required to still operate after having a 16 pound weight dropped onto a center region of the CWB 10. As another example, the CWB 10 may be required to be operational after being dropped from a defined height (e.g., approximately 48 inches) on multiple (e.g., all) faces, corners, and edges of the CWB 10 for one or more drops and while at temperatures that may range between −29° C. and 55° C. In addition, the CWB 10 may be required to survive various vibration and mechanical shock tests per one or more operational or safety standards, such as MIL-PRF-32383. By reducing the shock load on the battery core pack 25, the risk of damage to the PCB 30 and the PCBA 20 is greatly reduced, thus improving the overall durability of the CWB 10. The central stiffener 100 may be formed from a non-metallic material that provides additional stiffness to the battery core pack 25, but is also flexible enough to allow the CWB 10 to flex the desired amount while having adequate strength to not crack or fail when submitted to the shock and impact loads experienced by the CWB 10. For example, CWB 10 may be required to flex at least 800 times under load to a 7 inch radius curved surface, such that an edge of the CWB 10 may be capable of deflecting, in each direction, at least a specified distance (e.g., 1 inch) from a centerline of the CWB 10 without sustaining physical or electrical damage.

As shown in FIGS. 3A-3B, the battery core pack 25 may be received into an interior cavity 66 of a housing 60 to provide protection for the CWB 10. The housing 60 may include an upper housing member 62 and a lower housing member 64 that may be connected together to form the interior cavity 66. In addition, the upper housing member 62 and the lower housing member 64 may be sealed together along the perimeter to protect the battery core pack 25 from ingress of solid material and/or liquid material. A damaged battery cell 50 may be a fire hazard and/or could render the CWB 10 inoperable. The material forming the central stiffener 100 may comprise a flame proof material (e.g., a UL94 V-0 material). Accordingly, the central stiffener 100 may also form a fire barrier between the battery cells 50 on the upper portion 34 of the PCB 30 and the battery cells 50 on the lower portion 36 of the PCB 30. In short, the central stiffener 100 may be both electrically and thermally insulative.

As discussed above, CWB 10 may meet the requirements of MIL-PRF-32383/4A. Each housing member 62, 64 may be flexible and may be formed from a polymeric material using an injection molding or other technique known to one skilled in the art. Accordingly, housing 60 (and each housing member 62, 64) may be flexible or bendable to be able to withstand repeated bending or flexing cycles to allow CWB 10 to meet the requirements of MIL-PRF-32383/4A as described above. The housing members 62, 64 may be injection molded from a polymeric material that has elastomeric properties to allow the housing members 62, 64 and housing 60 to flex and bend. For example, the housing members 62, 64 may be formed from a thermoplastic elastomer (TPE), a thermoplastic urethane (TPU), thermoplastic vulcanizates (TPV), or other similar material.

Figure 6:
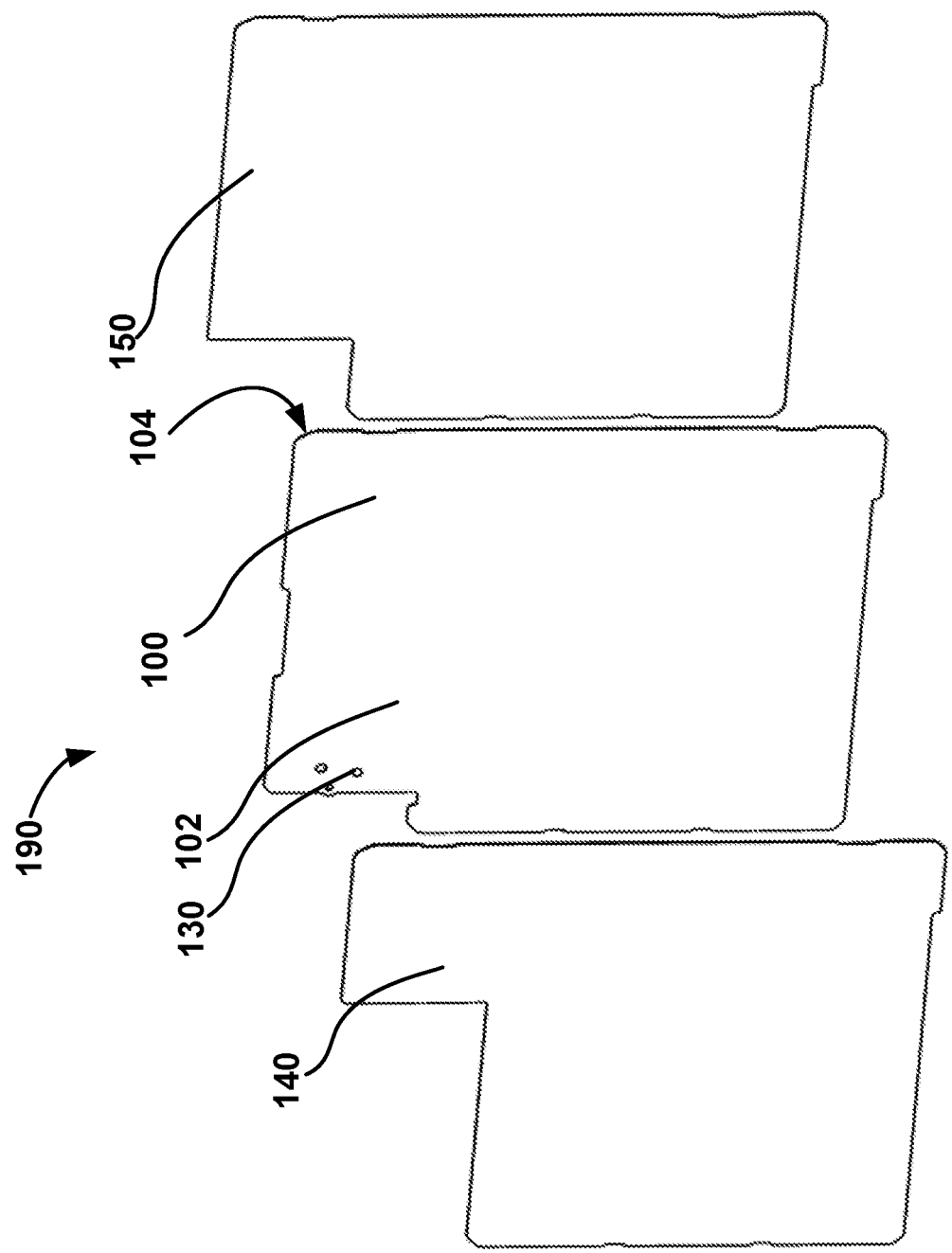
FIG. 6 illustrates a left, front exploded perspective view of the exemplary central stiffener sub-assembly of the battery cell core pack assembly of FIG. 2A according to aspects described herein.

The arrangement of the battery cells 50 on the outward facing surfaces 38A, 38B of the flexible PCB 30 positions an outward facing surface 52 of each battery cell 50 to face an interior surface 68 of either the upper housing member 62 or the lower housing member 64 as shown in FIGS. 4A and 4B. Additionally, a plurality of battery cell shock-attenuating members 70 may be individually attached to the outward facing surface 52 of each battery cell 50. Similar to the central stiffener 100, each battery cell shock-attenuating member 70 may be electrically insulating. Each battery cell shock-attenuating member 70 may be positioned between an outward facing surface 52 of a battery cell 50 and an interior surface 68. In addition, each battery cell shock-attenuating member 70 may also contact an interior surface 68 of the housing members 62, 64. The central stiffener 100 may be located between the battery cells 50 arranged on the upper portion 34 of the folded PCB 30 and the lower portion 36 of folded PCB 30, as shown in FIG. 4A and in more detail in the partially enlarged view of FIG. 4B. In particular, the central stiffener 100 may be positioned between both inward facing surfaces 40A, 40B of the upper portion 34 and the lower portion 36 of the flexible folded PCB 30. The central stiffener 100 may be secured to both the upper portion 34 of the flexible folded PCB 30 and the lower portion 36 of the flexible folded PCB 30 with an adhesive. In the exemplary embodiment, the adhesive used to secure the central stiffener 100 is an adhesive tape, where central stiffener 100 may be secured to the upper portion 34 of the flexible PCB 30 with a first adhesive tape 140 and may be secured to the lower portion 36 of the flexible PCB 30 with a second adhesive tape 150. Additionally, the first adhesive tape 140 may be different than the second adhesive tape 150. For instance, the first adhesive tape 140 may have a different thickness than the second adhesive tape 150. In some examples, as shown in FIG. 6 and will be explained in more detail below, the first and second adhesive tapes 140, 150 may be affixed to the central stiffener 100 to form a stiffener sub-assembly 190 to make it easier to assemble the central stiffener 100 to the PCBA 20 to form the battery core pack 25.

The battery cell shock-attenuating members 70 may be located between the battery cells 50 and the housing 60, as shown in FIG. 4A, where the battery cell shock-attenuating members 70 may help to protect the battery cells 50 by absorbing a portion of the forces received by the CWB 10 from any impacts or collisions. The battery cell shock-attenuating members 70 may help to absorb some of the shock forces that may be experienced by the battery core pack 25 and the CWB 10. Each battery shock-absorbing member 70 may compress up to 80 percent when subjected to an impact load. For instance, each battery shock-absorbing member 70 when compressed 80 percent, may absorb up to 400N of force over an area of 1140 $mm^2$ area, or 0.35 $N/mm^2$ (0.35 MPa). In addition, at higher strain rates, such as impact or shock loading, each shock-absorbing member 70 may be compressed up to 80 percent of the thickness, where the shock-absorbing member 70 may push back against the impact with a pressure of less than or up to 0.40 $N/mm^2$ (0.40 MPa). In some cases, the shock-attenuating members 70 may absorb up to 30 percent and in some cases up to 50 percent of an impact force applied to the CWB 10 to help protect the battery cells 50 from the impact force.

In an illustrative example, each battery cell 50 of the plurality of battery cells may be a pouch cell type battery (i.e., a packaged polymer lithium-ion battery or similar type battery). For instance, each battery cell 50 may include a pouch cell portion and a foil portion that surrounding at least three sides of the pouch cell portion. The foil portion may have a length that is greater than a length of the pouch cell portion. In addition, the foil portion may contact the sides of the pouch cell portion across the width of the battery cell 50. Each battery cell 50 (e.g., polymer battery cell) may have a non-cylindrical shape and may have a generally rectangular cuboid shape or a substantially parallelepiped shape. In some examples, each battery cell 50 may be a lithium-ion pouch cell, where the lithium-ion pouch cell is sealed on one side of the battery cell 50. The positive-charge electrical terminal and the negative-charge electrical terminal may exit from or near the same side the pouch cell portion is sealed and extend in a direction such that the terminals extend away from the sealed side of the battery cell 50. In some examples, the terminals of each battery cell 50 may electrically connect to the flexible PCB 30 on an inward facing surface 40A, 40B of the respective upper and lower portions 34, 36 of the folded PCB 30. In some cases, one or more of the battery cells 50 may have a different packaging format, such as a prismatic cell, a cylindrical cell, and/or the like.

Additionally, the dimensions of the battery cell 50 may be about 43 mm in length (BL), about 34 mm in width (BW), and about 6 mm in height (BH), but battery cells of other dimensions may be used within the scope of this disclosure. Additionally, each battery cell 50 may weigh between 22.5 grams and 24.5 grams (e.g., 23.5 grams) and may have an energy storage capacity between 1400 mAh and 1500 mAh (e.g., about 1,435 mAh). The size, weight, and energy storage capacity of each battery cell 50 of the CWB 10 may be designed such that the overall size, weight, and energy storage capacity of the flexible battery cell core pack assembly 25 for the CWB 10 meets an energy storage capacity specification, weight specification, and/or size specification for a CWB 10. For example, the height, width, and length of each battery cell 50 may be designed, at least in part, to meet a flexibility requirement of the CWB 10. The size, and/or shape of the battery cells 50 may allow for a specified number of battery cells (e.g., about 36 battery cells) and/or configuration of the battery grid such that the energy capacity for the CWB 10 may be at least 148 Watt-hours (Wh) (e.g., about 150 Wh, about 170 Wh, about 190 Wh, about 200 Wh, etc.) and/or where the maximum weight of the CWB 10 is less than a specified maximum weight (e.g., about 2.6 pounds). In some cases, a configuration of the battery cells 50 of the CWB 10 may allow the CWB 10 to output a voltage between about 10 and about 20 V, (e.g., about 14.8V) within a specified size and/or shape of the CWB 10. For example, an illustrative CWB 10 may have an overall dimensions of between about 8.5 inches (in.) (215.9 mm) and 9.0 inches (228.6 mm), (e.g., about 8.7 in. (221 mm)) in length and between about 7.5 in. (190.5 mm) and 8 in. (203.2 mm), (e.g., about 7.66 in. (194.6 mm) in width and between about 0.5 in. (12.7 mm) and 0.8 in. (20.3 mm), (e.g., 0.70 in. (17.8 mm)) in thickness or depth.

As the battery cells 50 go through cycles of discharging and recharging, the chemical reaction inside the battery cells 50 may cause the battery cells 50 to swell or increase in volume. The battery cells 50 may swell on one side or both sides (e.g., a front and rear side of the battery cell 50). A chemical system of battery cell 50 may include one of a lithium cobalt oxide, nickel cobalt manganese, nickel cobalt aluminum, or other such chemical systems. In some examples, each battery cell 50 may also go through cycles of swelling and then shrinking (e.g., increasing and decreasing in volume) as it goes through the discharging and recharging cycles. When a battery cell 50 swells, the battery cell 50 may expand into a void or cavity 74 created by an opening 72 in the battery cell shock-attenuating member 70. In some cases, the battery cells 50 may encounter swelling of less than 4 percent. In other cases, the battery cells 50 may swell in a range between 4 percent and 10 percent. In still other cases, the battery cells 50 may encounter swelling of about 15 percent or less. In addition, each battery cells 50 may swell different amounts in various locations of the battery cell 50. For instance, each battery cell 50 may experience a greater amount of swelling in a central region than along its edges.

The flexible PCB 30 for the conformal wearable battery 10 according to aspects of the present disclosure may be configured to provide power and/or electrical signals from a plurality of battery cells 50 and/or other components of the PCBA 20. The flexible PCB 30 may be formed of one or more of a flexible polymer or plastic material, such as a polyimide or other such flexible substrate. In some cases, markings showing locations of placement of battery cells 50 may be formed through a silk screening process or other like method. Electrical conductors may be included in one or more layers of the flexible PCB 30. In some cases, electrical conductors may be configured as a conductive pattern (e.g., a copper overlay, a conductive ink, etc.) on the surface of the substrate of the flexible PCB 30. In some cases, exposed conductive features (e.g., conductors, a bare copper surface, a bare aluminum surface, etc.) may be coated with a coverlay substance, such as an electrical insulator. For conductive portions of the flexible PCB not covered with a coverlay, the surface may be plated, such as with an electroless nickel immersion gold (ENIG) finish, a lead-free immersion silver finish or other substances with improved conductive properties. The flexible PCB 30 may have a plurality of physical connection sections disposed in a grid-like pattern, where each of the plurality of battery cells 50 may be physically affixed to the flexible PCB 30 at a corresponding physical connection section of the plurality of physical connection sections.

Each battery cell shock-attenuating member 70 may have an opening 72 extending through the thickness of the battery cell shock-attenuating member 70. Each opening 72 may create a cavity 74 between the respective outward facing surface 52 of the battery cell 50 and one of the interior surfaces 68 of the housing 60. The cavity 74 may provide room for a battery cell 50 to expand into the cavity 74 to prevent any swelling induced stress on the battery cell 50 as it expands. The thickness of the battery cell shock-attenuating member 70 may be approximately 10 percent of the thickness of the battery cell 50, or may be within a range of 4 percent and 12 percent of the thickness of the battery cell 50. In some examples, the opening 72 may not extend through the entire thickness of the battery cell shock-attenuating member 70 creating a cavity 74 within the battery cell shock-attenuating member 70. For example, the opening 72 may extend from the rear surface of the battery cell shock-attenuating member 70 through at least 50 percent of the thickness, or through at least 75 percent of the thickness. In these cases, the depth of the cavity 74 may be within a range of 4 percent and 12 percent of the thickness of the battery cell 50.

In some examples, the opening 72 of the battery cell shock-attenuating member 70 may be substantially aligned with a center (e.g., a horizontal and/or a vertical centerline) of a pouch cell portion each battery cell 50. For purposes of this disclosure, substantially aligned means that a first axis extending normal from a geometric center point of a first component is collinear with a second axis extending in the same direction as the first axis from a geometric center of a second component are within 2 mm of each other. In some examples, the opening 72 may be offset from a center of the pouch cell portion of the battery cell 50. The shape of the battery cell shock-attenuating member 70 may be substantially rectangular although it may have any geometric shape, such as oval, circular, or other polynomial. In general, the shape of the battery cell shock-attenuating member 70 may correspond to the shape of each battery cell 50, where the length and width of the battery cell shock-attenuating member 70 may be substantially the same or within 5 percent of the length and width of the length and width of each battery cell 50. The perimeter edges of the battery cell shock-attenuating member 70 may extend to and cover the perimeter edges of the corresponding battery cell 50 that it is attached. The rear surface of each battery cell shock-attenuating member 70 may be affixed the outward facing surface 52 of each respective battery cell 50 with an adhesive, such as a glue, an epoxy, an acrylic, or a tape.

As shown in the illustrated example of FIG. 2B, the opening 72 may have an oval shape or may have a different shape such as a rectangular shape, circular shape, or other geometric shape. In some examples, the opening 72 may have a size that has an area that is within a range of 30 percent and 70 percent of an area of the front surface of the shock-absorbing member 70, where the area of the front surface is defined as the area of the front surface that is free of the opening 72.

The battery cell shock-attenuating members 70 may be formed from a visco-elastic material that can attenuate shock and vibration while also having electrically insulating properties. In addition, the shock-attenuating members 70 may be compressible to assist in absorbing any swelling from the battery cells 50. The shock-attenuating members 70 may be very compressible at low strain rates, such as a battery cell 50 swelling situation, where shock-attenuating member 70 may compress less than 50 percent of its thickness, the shock-absorbing members 70 may push back against the swelling battery with a pressure of less than or up to 0.05 N/mm2 (0.05 MPa). As such, if any of the battery cells 50 swell, a portion of the swelling may be absorbed by the compression of the shock-attenuating members 70 to prevent any swelling induced stress on the expanded battery cell 50. In some examples, the shock-attenuating members 70 may be compressed within a range of 7 percent and 12 percent. The shock-attenuating members 70 may be resilient to resist any permanent deformation caused by any swelling of the battery cells 50. This resilience allows the shock-attenuating members 70 to compress and expand to accommodate any cycling of a battery cell 50 swelling and then contracting partly or completely back to its normal size. By compressing and expanding to correspond with the swelling and shrinking of the battery cell 50, the shock-absorbing members 70 may not permanently deform or may have a minimal compression set. In some examples, the shock-attenuating members 70 may have a maximum compression set of between 2 percent and 5 percent when tested using ASTM D 1667-90 Test D @ 73° F. (23° C.).

The visco-elastic material may be formed from a polymeric material such as a polyurethane based material such as Poron®, Sorbothane®, or similar material. In some cases, the visco-elastic material may absorb heat to assist in conducting heat away from the battery cells 50. The battery cell shock-attenuating members 70 may be formed from the same material or, in some examples, formed from different materials. The material forming the battery cell shock-attenuating members 70 may be a polymeric foam (e.g., porous) or a solid polymeric material and may be formed from a sheet of material and then cut to the final shape using a die cutting, laser cutting, water jet cutting process, or other cutting process known to one skilled in the art. The battery cell shock-attenuating members 70 may have a constant thickness.

Figure 5:
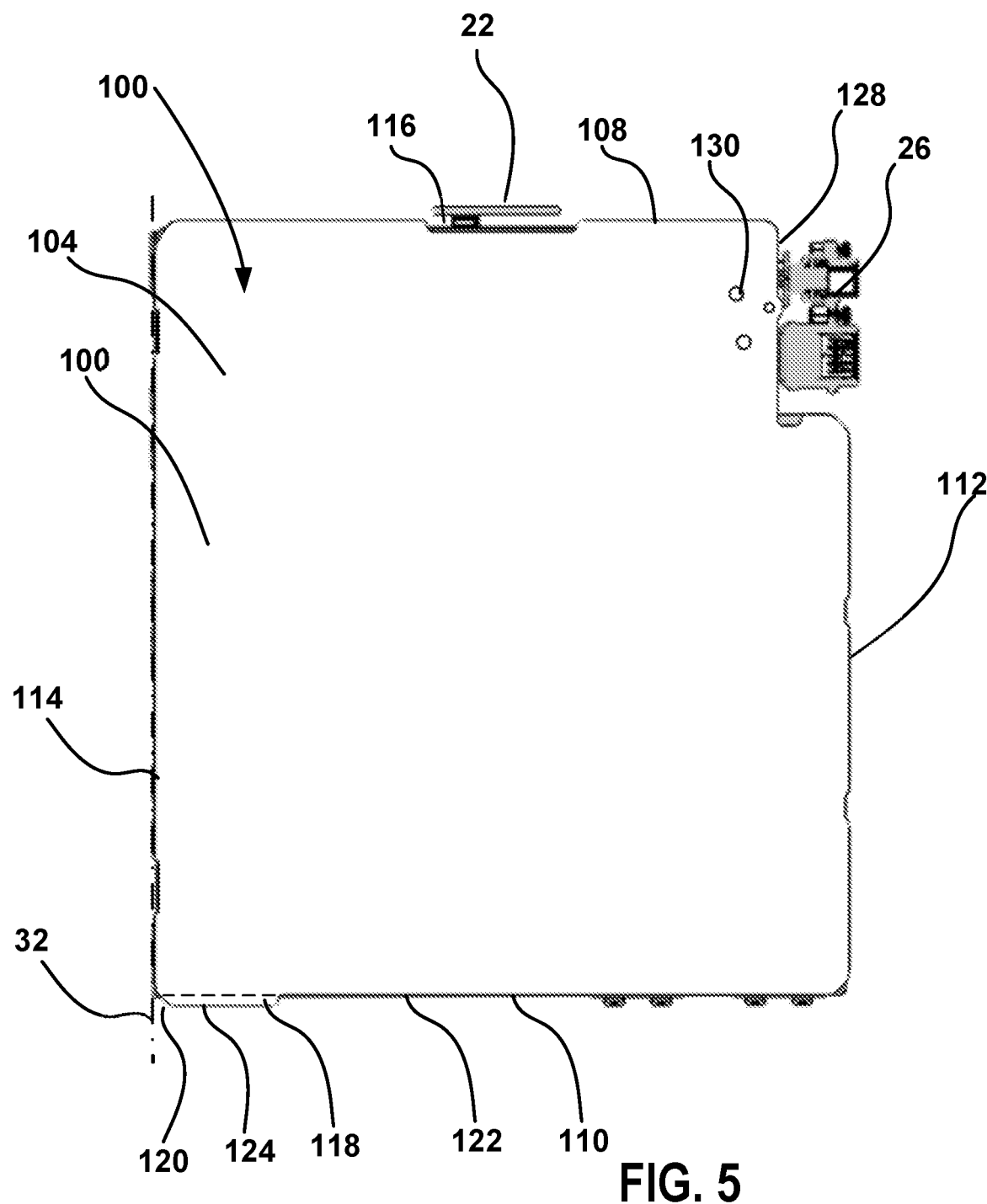
FIG. 5 illustrates a rear view of a first portion of the battery cell core pack assembly of FIG. 2A with a second portion of the battery core pack removed to illustrate the central stiffener of FIG. 1 according to aspects described herein.

Returning back to the central stiffener, the central stiffener 100 may have a geometric shape that generally corresponds to the overall footprint or shape of an upper portion 34 and/or a lower portion 36 of the flexible folded PCB 30 and/or the features of the battery cell core pack assembly 25, as shown in FIG. 5 that illustrates the battery core pack 25 with the lower portion 36 of the PCB 30 removed for clarity. The central stiffener 100 may have a width that extends from the first side 112 to the second side 114. The width may be at least 90 percent of a width of the upper portion 34 and/or the lower portion 36 of PCB 30. At a minimum, the stiffener 100 may extend underneath the footprint of the plurality of battery cells 50 to prevent the PCB 30 from excessive localized flexing under each individual battery cell 50 when the CWB 10 is subjected to shock forces (e.g. such as caused by dropping the CWB 10). In some examples, the central stiffener 100 may have a profile shape that is slightly larger (e.g., less than 2 mm) than the upper portion 34 and the lower portion 36 of the folded PCB 30 on the sides 108, 110, 112 that are opposite and adjacent the bend axis 32 of the PCB 30.

As shown in FIGS. 1, 5, and 6, the central stiffener 100 may have an upper cutout 116 that corresponds to positioning of a flex circuit extension for a display component 22 of the PCBA 20. In addition, the central stiffener 100 may also include one or more protrusions (e.g., a protrusion 118) that extend outward along the lower side 110. The protrusion 118 may extend inward a distance of approximately 33 mm from a corner 120 formed at the intersection of the lower edge 124 of protrusion 118 and the second side 114 and also may extend a distance of 3 mm beyond a lower edge 122 of the lower side 110. The corner 120 of the protrusion 118 may extend beyond a corresponding corner on either the upper portion 34 and/or the lower portion 36 of the folded PCB 30 such that if the CWB 10 is dropped at that corner, the stiffener 100 would absorb at least a portion of the impact force prior to it being transmitted to the PCB 30 and/or the PCBA 20 and reduce the energy received by the battery cells 50. In some examples, the stiffener 100 may have a plurality of corners that extend beyond multiple corresponding corners of the flexible PCB 30. The central stiffener 100 may also include notches 126 that correspond to notches or slots along the side or near the longitudinal bend axis 32 of the PCB 30. A cutout 128 may be arranged at a corner diagonally opposite from the protrusion 118. This cutout 128 may have a generally rectangular shape, which may leave the length of the upper side 108 being less than a length of the lower side 110 and the first side 112 having a length that is less than a length of the second side 114. The cutout 128 may correspond to a location of one or more connectors (e.g., a connector module 26) that facilitate an electrical connection and/or communication to one or more external devices. In addition, the stiffener 100 may include a hole or a hole pattern 130 that may be used to connect to a connector stabilizer 28 that attaches to each side the connector module(s) 26 of the battery core pack 25 to form a unified flexible structure to help to reduce stress and/or strain on the flex circuits that lead to the connector module(s) 26 and avoid tears in the flex circuits. The connector stabilizer 28 may be a formed from one or more structures that fits over the connector module(s) 26 on one or both sides. The connector stabilizer 28 may include a hole or hole pattern 29 that corresponds to the hole pattern 130 of the central stiffener 100. The hole patterns 29, 130 may receive a fastener or plurality of fasteners to join the stabilizer 28 and the stiffener 100 together.

In addition, some examples of the battery core pack 25 may include a corner bumper 180, as shown in FIGS. 10A-10B, which is configured to attach to the PCBA 20 and extend along a portion of two sides of the battery core pack 25. For instance, as depicted in FIG. 2A, the corner bumper 180 may span exposed adjacent sides of opposing battery cells affixed to the upper portion 34 of the folded PCB 30 and the lower portion 36 of the folded PCB 30. For example, a portion of the corner bumper 180 may span between an upper edge of a first battery cell 50 affixed to the upper portion 34 of the folded PCB 30 to an upper edge of a second battery cell 50 affixed to the lower portion 36 of the folded PCB 30. In addition, the corner bumper 180 may have a first side 182 that extends along a side of the battery core pack 25 and a second side 184 that extends along an adjacent side of the battery core pack 25. The first side 182 and the second side 184 each may have a length 185, where the length 185 may extend a majority of a length and/or a majority of a width of a battery cell 50. In addition, the first side 182 may have a slot 186 that extends through the corner bumper 180 for a majority of the length of the first side 182. The slot 186 may be centrally located along the width 187 of the corner bumper 180. The slot 186 may receive a portion of the flexible PCB 30 that folds along the axis 32 to further protect the folded PCB 30 from damage during impacts. The second side 184 may have an internal notch 188 that receives protrusion 118 of the central stiffener 100. The corner bumper 180 may be secured to the battery core pack 25 using an adhesive, which in some cases may be a non-conductive tape. In addition, the battery core pack 25 may also include a plurality of straight bumpers 189 that may be arranged in various locations along the edges of the battery core pack 25, such as the lower end and side as shown in FIGS. 2A-2B. The corner bumpers 180 and straight bumpers 189 may be formed from an impact absorbing foam or similar type material and may help to absorb the impact of a corner, side, or end drop of the CWB 10 to prevent any damage to the battery cells 50.

The central stiffener 100 may be formed from a non-metallic material that provides stiffness to the battery core pack 25 to prevent damage to any components or battery cells 50 on the PCBA 20 while also allowing the CWB 10 to flex within a desired range. The stiffener 100 also has the strength to not crack or fail when submitted to the shock and impact loads or repeated flexing experienced by the CWB 10. To meet these requirements, the material of the central stiffener 100 may have an elastic modulus within a range of 2.0 GPa and 15 GPa and also have an ultimate tensile strength within a range of 69 MPa and 276 MPa. In addition, the material have a high impact strength (e.g., an impact strength of approximately 748 J/m, or within a range of 700 J/m and 800 J/m when tested using an Izod Impact Test) and a high flexural strength of approximately 517 MPa at a thickness of 0.254 mm, or where the flexural strength may be within a range of 410 MPa and 560 MPa when tested per a three-point flexural test for ceramics test method. This flexural strength and high impact strength allows the central stiffener 100 to resist large deformation under high impulse or impact loading, while having a minimal thickness to meet the specified flexibility requirements. The non-metallic material (e.g., non-conductive material) of the central stiffener 100 may be a polymeric material that is filled or unfilled. For instance, the central stiffener 100 may be formed from a polycarbonate material or may be a glass filled composite material such as FR4 or G10. In particular, non-homogenous materials may be well suited to form the central stiffener 100. The central stiffener 100 may have a constant thickness, and in some cases may be formed may be formed from a sheet of material and then cut to the final shape using a die cutting, laser cutting, water jet cutting process, or other cutting process known to one skilled in the art. The central stiffener 100 may have a thickness of approximately 0.25 millimeters, or a thickness within a range of 0.13 millimeters and 0.38 millimeters.

In some examples, the central stiffener 100 may include areas of different strength or stiffness. For instance, the central stiffener 100 may have areas of different thicknesses, such as having a thinner regions that correspond to the flex regions of the PCB 30, such as the area between the battery cells 50 located between rows of components (e.g., battery cells 50) along which the CWB 10 may bend during use. In addition, the central stiffener 100 may be formed of multiple materials, such as having regions formed of polyimide or other flexible material to allow the central stiffener to have flexible regions. These flexible regions may be located similarly to correspond to the regions between the battery cells 50 that may bend during use. Alternatively, the central stiffener 100 may have localized regions to increase the strength or stiffness such as areas of greater thickness or of a material with a higher elastic modulus. As another option, the central stiffener 100 may be coated with a material locally (e.g., such as around the corners and edges) to increase the strength of these regions. The coating may be metallic or non-metallic to locally increase the strength and/or stiffness of the edges and corners.

As discussed above, to stiffener 100 may be secured to the PCB 30 using an adhesive and as shown in the illustrated example of FIGS. 2A, 2B, 2C, 4A, 4B, and 5, the stiffener 100 may be secured to the upper portion 34 of the PCB 30 and secured to the lower portion 36 of the PCB 30 using a first adhesive tape 140 attached to the front surface 102 and a second adhesive tape 150 attached to the rear surface 104 of the stiffener 100. Each adhesive tape 140, 150 may be a double-sided tape with an adhesive on both sides to allow each adhesive tape 140, 150 to adhere to both the stiffener 100 and to the PCB 30. As shown in FIG. 6, each adhesive tape 140, 150 may generally have a similar perimeter profile and shape (at least matches 75 percent of an upper or lower portion 34, 36 of the PCB 30 profile shape). To facilitate assembly, a stiffener sub-assembly 190 may be formed prior to installation of the stiffener sub-assembly 190 as part of the battery core pack 25. The first adhesive tape 140 may be foam tape, such as an acrylic foam tape, and may have a conformable backing to provide some damping and shock absorption between the PCB 30 and the stiffener 100. In some examples, the first adhesive tape 140 may have a first thickness of approximately 0.5 mm, or within a range of 0.3 mm and 0.7 mm. The first thickness of the first adhesive tape may be greater than the thickness of the central stiffener 100. The second adhesive tape 150 may be foam tape, such as an acrylic foam tape, and may have a conformable backing to provide some damping and shock absorption between the PCB 30 and the stiffener 100. The second adhesive tape 150 may have a second thickness that is less than a first thickness of the first adhesive tape 140. For instance, the second adhesive tape 150 may have a second thickness of approximately 0.2 mm, or within a range of 0.1 mm and 0.3 mm. For example, the exemplary tapes may be a VHB tape made by 3M or a foam tape made by TESA. The adhesive used on both tapes may be acrylic based, or may be epoxy based. The different tape thicknesses of the adhesive tapes 140, 150 may help maintain planarity of the PCBA 20, which may prevent any type of a pre-stressed condition within the PCBA 20 and/or the battery core pack 25. The first adhesive tape 140 may have a cutout 142 in one corner to accommodate a localized rigid section on the PCB 30. Additionally, the first adhesive tape 140 may also have different damping properties than the second adhesive tape 150. Alternatively, the first and second adhesive tapes 140, 150 may be the same type of tape with the same thickness. Optionally, the adhesive tapes 140, 150 may be applied in strips to the stiffener 100 or other shapes that are not substantially similar to the shape of the central stiffener 100.

Figure 7:
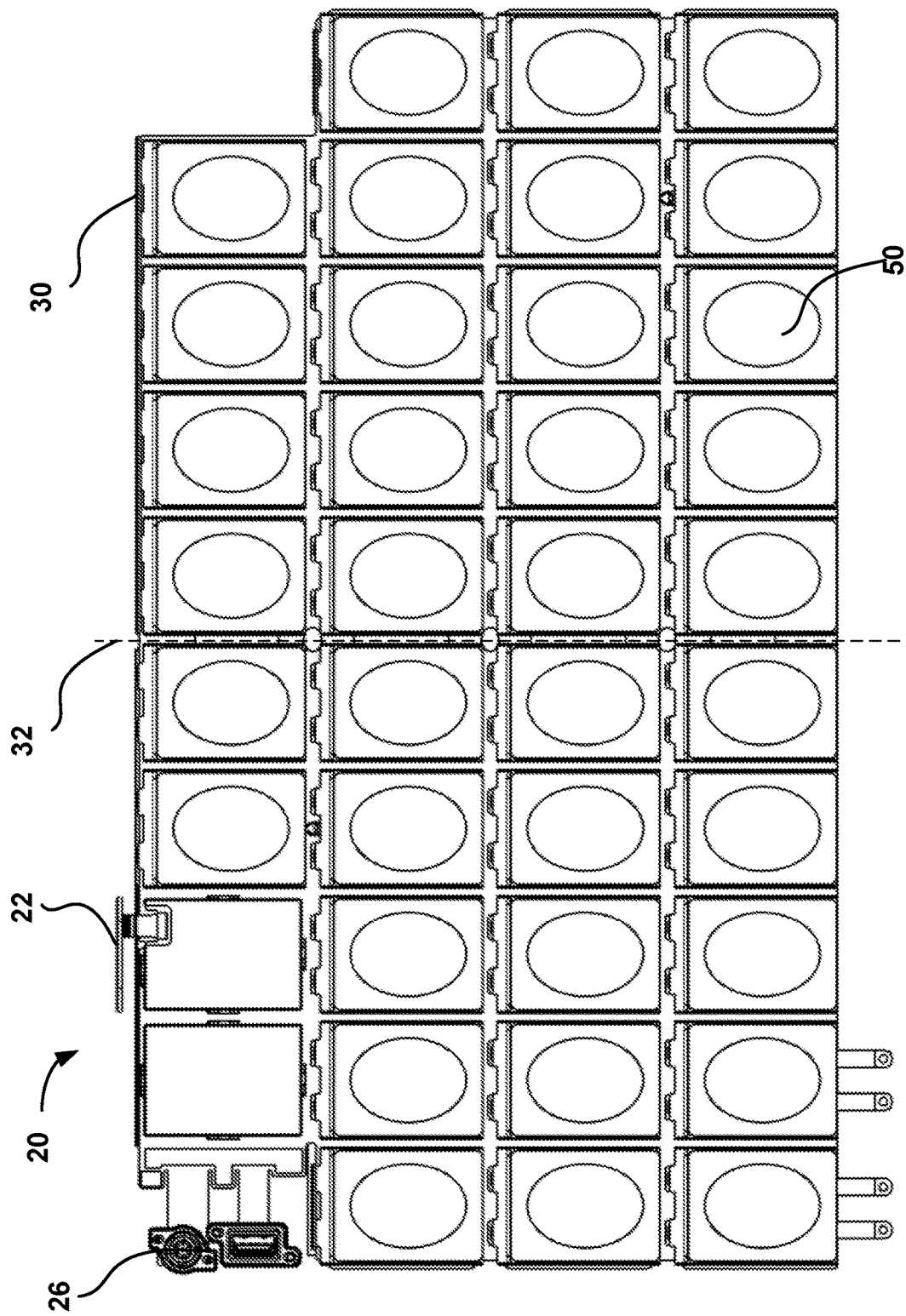
FIG. 7 illustrates a front view of the PCBA of the battery cell core pack assembly of FIG. 2A without an exemplary stiffener sub-assembly in an unfolded configuration before folding along the center line according to aspects described herein.

FIG. 7 illustrates a front view of the flexible PCBA 20 before folding along the bend axis 32 according to aspects of the present disclosure. An array of battery cells 50 may be physically and electrically attached to the flexible PCB 30 as described below. One or more connectors (e.g., a connector module 26) that facilitate an electrical connection and/or communication to one or more external devices may be attached to an upper portion 34 of the flexible PCB 30.

Figure 8B:
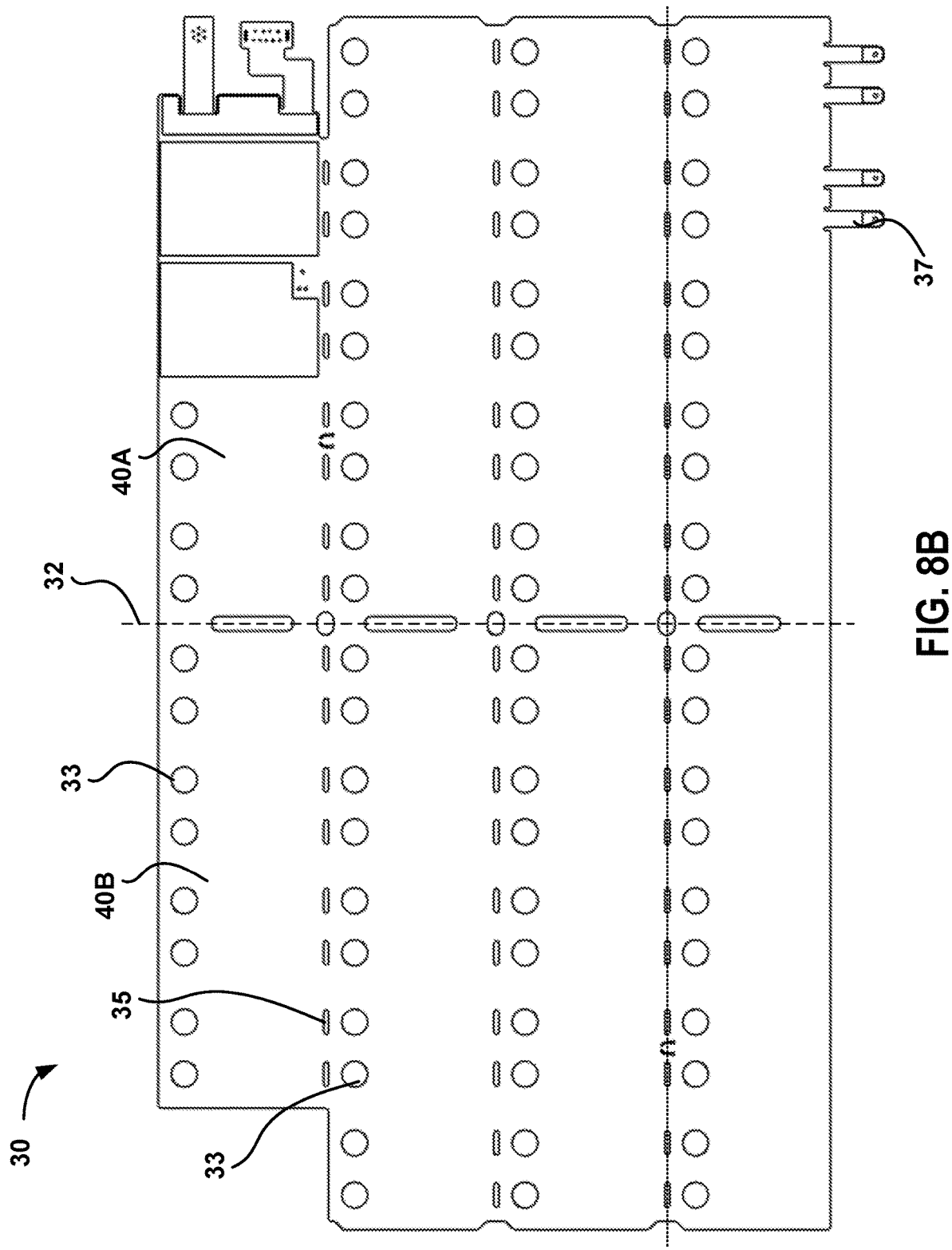
FIG. 8B illustrates a rear view of the illustrative flexible printed circuit board for the illustrative conformal wearable battery system according to aspects described herein.

FIG. 8A-8B illustrate front and rear views respectively of a flexible printed circuit board (PCB) 30 for an illustrative CWB 10 according to aspects of the present disclosure. The flexible PCB 30 may be configured to provide power and/or electrical signals from a plurality of battery cells and/or other components of a CWB 10. The flexible PCB 30 may be formed of one or more layers of a flexible polymer or plastic material, such as a polyimide or other such flexible substrate. The PCB 30 may have a plurality of locations and/or physical connection sections 39 arranged in a grid-like pattern to receive a battery cell 50 that may be physically affixed to each of the plurality of physical connection sections 39. In some cases, markings showing locations of placement of battery cells may be formed through a silk-screening process or other like method. In some cases, markings may not be present on a surface of the flexible PCBA. Electrical conductors may be included in one or more layers of the flexible PCBA. In some cases, electrical conductors may be configured as a conductive pattern (e.g., a copper overlay, a conductive ink, etc.) on the surface of the substrate of the flexible PCB 30. In some cases, exposed conductive features (e.g., conductors, a bare copper surface, a bare aluminum surface, etc.) may be coated with a coverlay substance, such as an electrical insulator. For conductive portions of the flexible PCB not covered with a coverlay, the surface may be plated, such as with an electroless nickel immersion gold (ENIG) finish, a lead-free immersion silver finish or other substances with improved conductive properties.

The flexible PCB 30 may be configured to bend along a bend axis 32 located at or near a centerline of the flexible PCB 30. One or more elongated cutouts may be disposed parallel to the bend axis 32 and/or perpendicular to the bend axis 32, where the cutouts perpendicular to the bend axis 32 may be aligned with a flex line perpendicular to the bend axis 32. In some cases, the flex line may correspond to a section of the flexible PCB 30 located between rows of components (e.g., battery cells 50) along which the CWB 10 may bend during use. Such cutouts may provide additional flexibility to the flexible PCB 30 to allow for easier formation of a 180-degree bend such as by folding the upper portion 34 of the flexible PCB 30 over the lower portion 36 of the flexible PCB 30. In the illustrative example, relief cuts may be formed as a rounded elongated rectangular cutout and the cutout may be formed in a generally obround shape (e.g., two substantially semi-circular sections connected by a rectangular section). As mentioned, the elongated rounded rectangular cutouts parallel to the bend axis 32 may reduce stress on the plastic substrate when forming the about 180-degree bend. Additionally, the obround-shaped cutouts may reduce stresses placed on the flexible PCB substrate during use, such as by reducing stresses along a line of deformation between battery cells 50. By reducing the bending stress at locations along the bend axis 32, a probability of a catastrophic failure of the substrate (e.g., cracking, delamination, and the like) is reduced. While the cutouts along the bend axis 32 are shown as a rounded rectangular shape and/or and an obround shape, other shapes may be used to reduce stress due to bending and/or flexing of the flexible PCB 30. Such other shapes may include circular cuts which may be used, for example, for removing more weight, oval cuts which may provide additional stress relief, for example, based on the curves, elongated slots which, for example, may be similar to the rectangular cuts but with even more filet on corners to reduce additional stresses, a dog-bone shape (e.g., two substantially circular sections connected by a rectangular section), or the like.

The flexible PCB 30 may also include a plurality of solder pads (e.g., pads 33) to provide electrical connection for the cathode and anode of each battery module. For battery cells, 50 located near an edge of the flexible PCB 30, the cathode and anode connectors may be bent over the edge of the flexible PCB 30. For battery cells located away from the edge of the flexible PCB, a plurality of cut-outs (e.g., cutout 35) are located near a corresponding pad 33 to allow for solder or weld connection of the battery cathode or anode connector to the flexible PCB 30. Additionally, the flexible PCB 30 may include charging connection portion 37 that may be used to connect to one or more charging tabs on an exterior portion of a housing 60 of the conformal wearable battery 10. Each battery cell physical connection section 39 may be associated with a pair of cutouts 35 for the anode and cathode connections, as discussed above. Here, a battery cell 50 may be physically attached to the substrate of the flexible PCB 30, such as by use of an adhesive material (e.g., glue, tape, etc.). The cathode and anode connection tabs may be inserted through a corresponding cutout 35 so that the connection tabs may be soldered, laser welded, or otherwise connected to the connection pad 33 on the inward facing sides 40A, 40B of the flexible PCB 30.

Figure 9B:
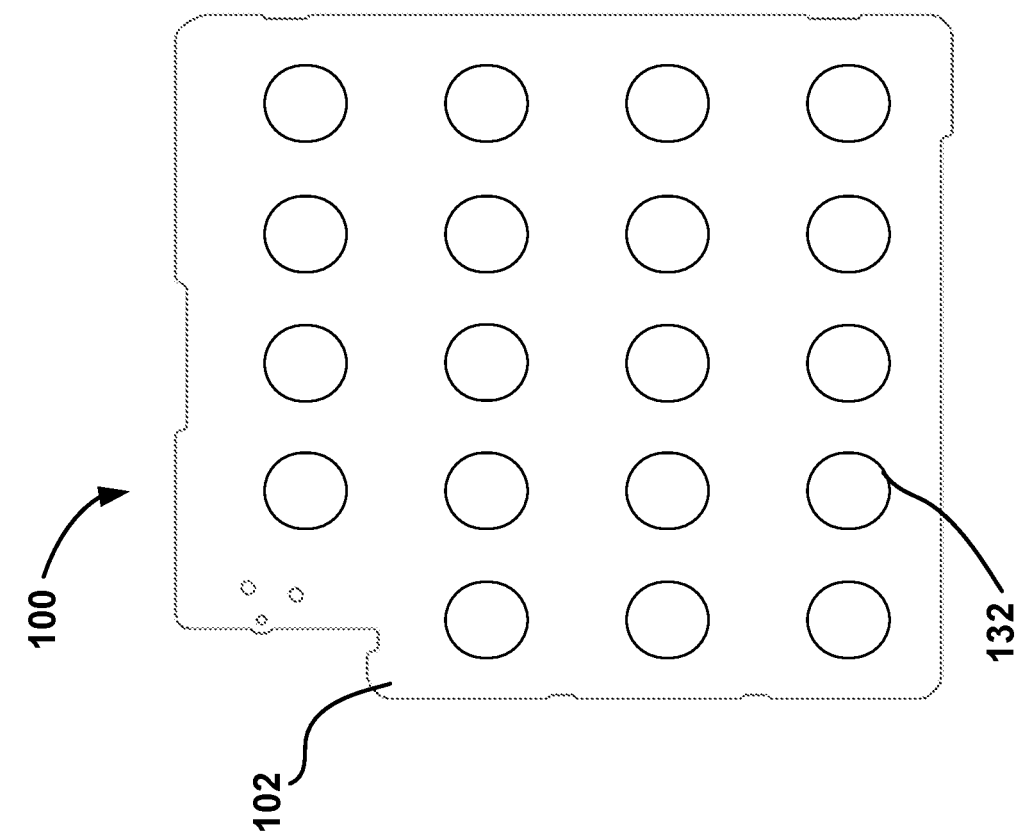
FIGS. 9A-9D illustrate front views of alternate exemplary central stiffeners according to aspects described herein.
Figure 9A:
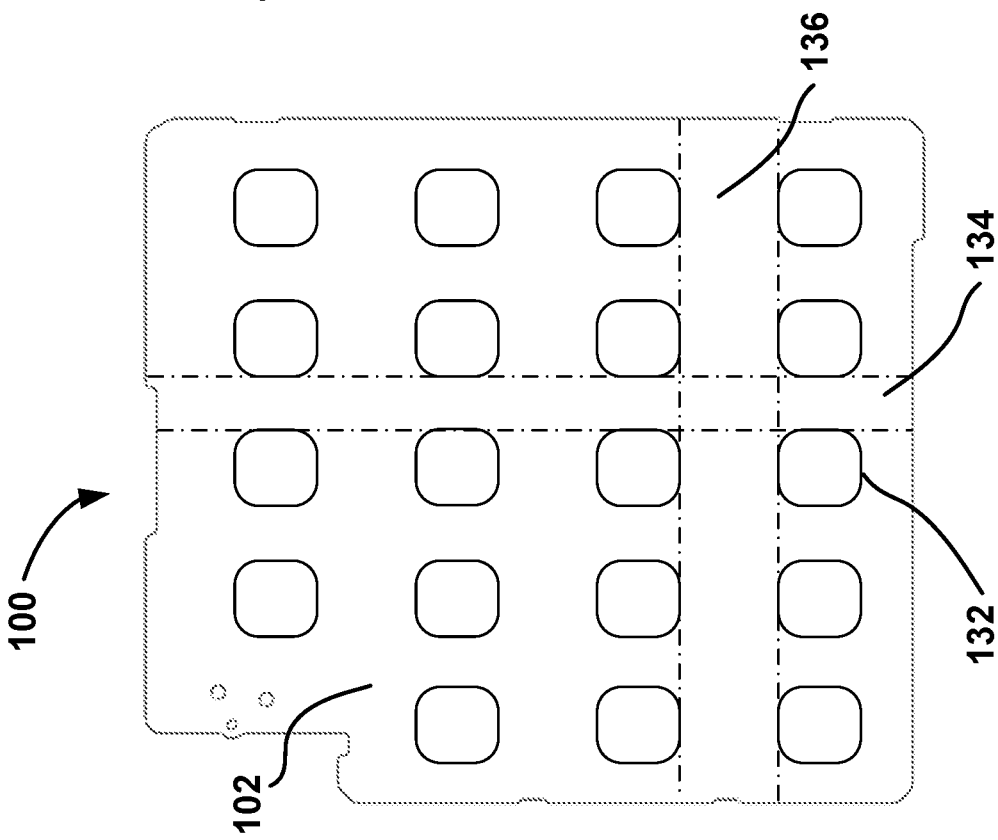
Figure 9D:
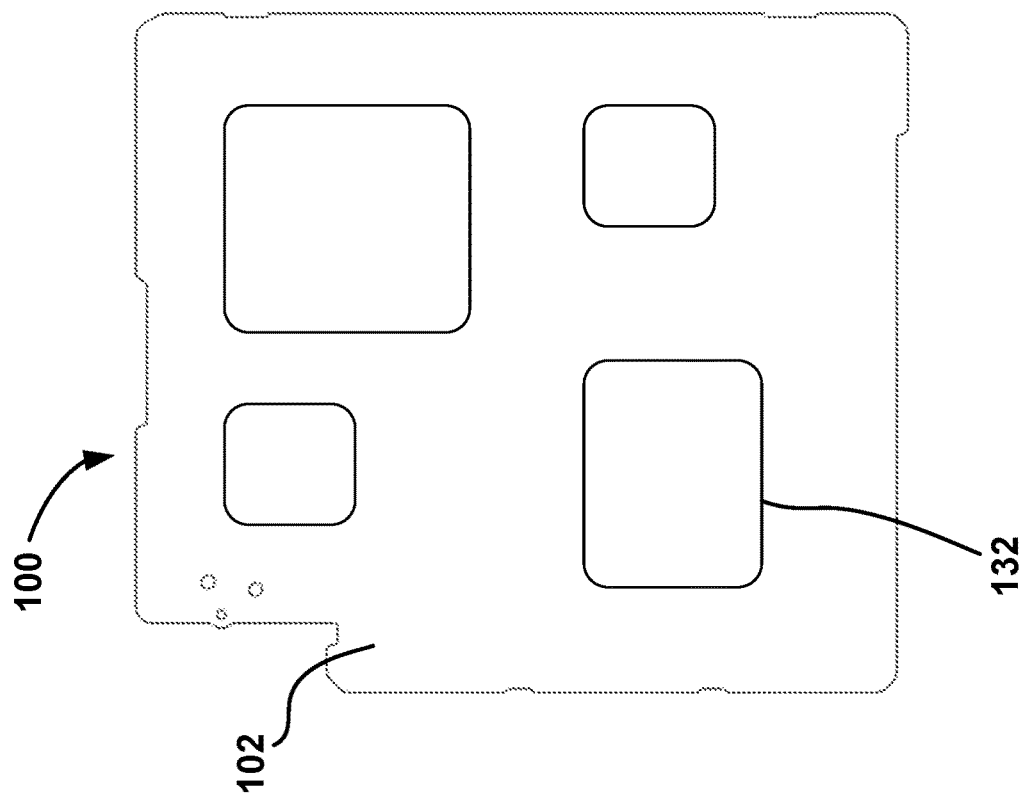
Figure 9C:
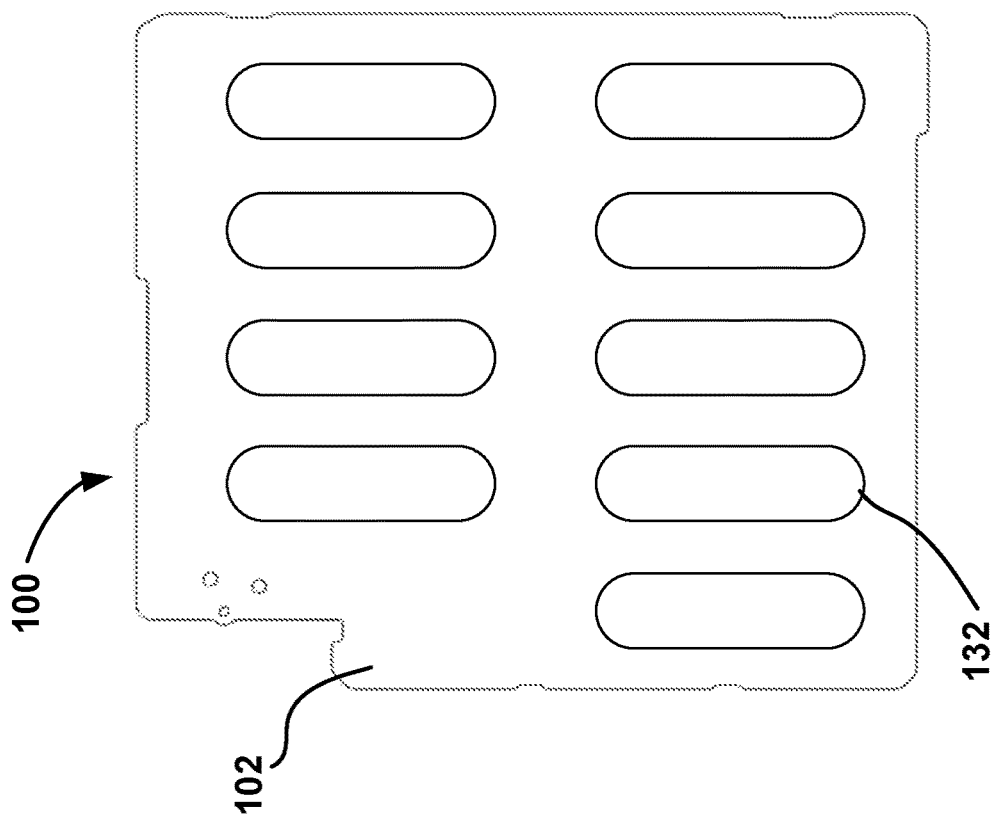

Because the CWB 10 is a portable battery system, the overall weight of the stiffener 100 may have weight saving features. As discussed above, the weight of the CWB 10 may be within a range of 2.6 pounds and 2.75 pounds (within a range of 1179 grams and 1248 grams), so in some examples, the stiffener 100 may have a weight of approximately 18 grams or may be within a range of 6 grams and 20 grams. In some examples, the central stiffener 100 may include an aperture 132 that extends through the central stiffener 100, (e.g., an opening extending through the front surface 102 and the rear surface 104). As shown in FIGS. 9A-9D, the aperture 132 may comprise a plurality of apertures 132 that are arranged in a pattern of rows and columns. The pattern of apertures 132 may allow for at least one longitudinal region 134 (outlined in dashed lines) that are free of apertures 132 and at least one lateral region 136 (outlined in dashed lines) that are free of apertures 132. The plurality of apertures 132 may be arranged in any number of rows and columns. For instance, the plurality of apertures 132 may have an arrangement of four rows and five columns as shown in FIGS. 9A and 9B, or the plurality of apertures 132 may have an arrangement of two rows and five columns as shown in FIG. 9C. The apertures 132 may have different shapes and sizes, where each aperture 132 may have an area (e.g., the size of the aperture as measured across the front surface 102) that is within a range of 12 mm$^2$ and 2000 mm$^2$. Optionally, an aperture 132 may have an area greater than 2000 mm$^2$. As shown in FIG. 9A, the plurality of apertures 132 may be similar in shape, and as illustrated the plurality of apertures 132 may be a plurality of substantially square shaped openings with curved or chamfered corners which may help to reduce or prevent any high stress areas in the corners of the apertures 132. In some examples, the apertures 132 may be round holes as shown in FIG. 9B. In other examples, the apertures 132 may be elongated openings that are arranged in a pattern of rows and columns as shown in FIG. 9C. The elongated openings may be arranged with the longer side of the elongated opening in a longitudinal direction, in a direction from the upper side 108 to the lower side 110, as illustrated or in a lateral direction, in a direction from the first side 112 to the second side 114). As another option, the plurality of apertures 132 may be arranged as a plurality of different shaped apertures that are arranged in an irregular pattern as shown in FIG. 9D. The apertures 132 in a stiffener may help to reduce the weight of a stiffener without apertures may by up to 50 percent. Additionally, the adhesive tapes 140, 150 may include cutouts that correspond to apertures 132 of the stiffeners 100 illustrated in FIGS. 9A-9D.

Aspects of the disclosure have been described in terms of illustrative examples thereof. Numerous other examples, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A conformal wearable battery comprising:
   a plurality of battery cells; and
   a folded flexible printed circuit board (PCB) comprising:
      a plurality of physical connection sections disposed in a grid like pattern, wherein each battery cells of the plurality of battery cells is affixed to the folded flexible PCB; and
      a bend axis that delineates an upper portion of the folded flexible PCB and a lower portion of the folded flexible PCB;
   a central stiffener positioned between and affixed to the upper portion of the folded flexible PCB and the lower portion of the folded flexible PCB, the central stiffener comprising a non-metallic material with a flexural strength within a range of 410 MPa and 560 MPa; and
   a flexible housing that receives the plurality of battery cells, the folded flexible PCB, and the central stiffener.

2. The conformal wearable battery of claim 1, wherein the central stiffener comprises a glass filled composite.

3. The conformal wearable battery of claim 1, wherein the central stiffener comprises a polycarbonate material.

4. The conformal wearable battery of claim 1, wherein the central stiffener has a thickness within a range of 0.13 millimeters and 0.38 millimeters.

5. The conformal wearable battery of claim 1, wherein the central stiffener includes a corner that extends beyond a corresponding corner of the folded flexible PCB.

6. The conformal wearable battery of claim 5, wherein the corner of the central stiffener comprises a protrusion that extends beyond a lower edge of the central stiffener.

7. The conformal wearable battery of claim 6, further comprising a corner bumper adjacent to a corner of the folded flexible PCB, wherein the corner bumper includes a notch that receives the protrusion of the central stiffener.

8. The conformal wearable battery of claim 1, wherein the central stiffener has an elastic modulus within a range of 2.0 GPa and 15 GPa.

9. The conformal wearable battery of claim 1, wherein the central stiffener is affixed to the upper portion of the folded flexible PCB with a first adhesive tape and is secured to the lower portion of the flexible PCB with a second adhesive tape, wherein the first adhesive tape has a different thickness than the second adhesive tape.

10. The conformal wearable battery of claim 1, wherein the central stiffener includes an aperture that extends through the central stiffener, wherein the aperture of the central stiffener comprises a plurality of apertures that are arranged in a pattern of rows and columns.

11. The conformal wearable battery of claim 1, wherein the non-metallic material has an ultimate tensile strength within a range of 69 MPa and 276 MPa.

12. The conformal wearable battery of claim 1, wherein the central stiffener includes a hole near an upper corner of the central stiffener to connect to a connector stabilizer on at least one side of the folded flexible PCB, wherein a fastener is received in a hole of the central stiffener and a hole in the connector stabilizer.

13. A conformal wearable battery comprising:
   a battery cell core pack assembly comprising:
      a folded flexible printed circuit board (PCB), wherein a bend axis that delineates an upper portion of the flexible PCB and a lower portion of the flexible PCB;
      a plurality of battery cells affixed to the flexible PCB; and
      a non-metallic central stiffener positioned between the upper portion of the folded flexible PCB and the lower portion of the folded flexible PCB preventing the upper portion from contacting the lower portion, wherein a corner of the central stiffener extends beyond a corresponding corner of the upper portion or the lower portion of the flexible PCB; and
   a housing that includes an upper housing member, a lower housing member, and an internal cavity, wherein the internal cavity receives the battery cell core pack assembly.

14. The conformal wearable battery of claim 13, wherein the central stiffener is secured to the upper portion of the flexible PCB with a first adhesive tape having a first tape thickness and is secured to the lower portion of the flexible PCB with a second adhesive tape having a second tape thickness, and
   wherein the first tape thickness is different than the second tape thickness.

15. The conformal wearable battery of claim 14, wherein the second adhesive tape comprises a foam tape, and wherein the second tape thickness is greater than the first tape thickness.

16. The conformal wearable battery of claim 13, wherein the central stiffener has a thickness within a range of 0.13 millimeters and 0.38 millimeters.

17. The conformal wearable battery of claim 13, wherein the central stiffener has an elastic modulus within a range of 2.0 GPa and 15 GPa.

18. The conformal wearable battery of claim 13, wherein the central stiffener has a weight within a range of 6 grams and 20 grams.

19. A system comprising:
   a battery cell core pack assembly comprising:
      a folded flexible printed circuit board (PCB), wherein a bend axis that delineates an upper portion of the folded flexible PCB and a lower portion of the folded flexible PCB;
      a plurality of battery cells affixed to the flexible PCB, wherein each battery cell of the plurality of battery cells is a pouch cell type battery; and
      a central stiffener positioned and affixed between the upper portion and the lower portion of the flexible PCB preventing the upper portion from contacting the lower portion, the central stiffener having a corner that extends beyond a corresponding corner of the flexible PCB,
      wherein the central stiffener comprises a glass filled composite and is secured to the upper portion of the folded flexible PCB with a first adhesive tape and is secured to the lower portion of the folded flexible PCB with a second adhesive tape, and
      wherein the first adhesive tape has a different thickness than the second adhesive tape; and
   a housing that includes an internal cavity, wherein the internal cavity receives the battery cell core pack assembly.

20. The system of claim 19, wherein the corner of the central stiffener comprises of a protrusion that extends beyond a lower edge of the central stiffener.